US010077016B2

(12) United States Patent
Smith et al.

(10) Patent No.: US 10,077,016 B2
(45) Date of Patent: Sep. 18, 2018

(54) RETRACTABLE STEP AND SIDE BAR ASSEMBLY FOR RAISED VEHICLE

(71) Applicant: Lund Motion Products, Inc., Buford, GA (US)

(72) Inventors: Anthony Nicholas Smith, Huntington Beach, CA (US); Eric Charles Bajza, Orange, CA (US); William Franklin Bibb, VI, Littleton, CO (US)

(73) Assignee: Lund Motion Products, Inc., Buford, GA (US)

( * ) Notice: Subject to any disclaimer, the term of this patent is extended or adjusted under 35 U.S.C. 154(b) by 0 days.

(21) Appl. No.: 15/406,982

(22) Filed: Jan. 16, 2017

(65) Prior Publication Data

US 2017/0190308 A1    Jul. 6, 2017

Related U.S. Application Data

(63) Continuation of application No. 14/846,433, filed on Sep. 4, 2015, now Pat. No. 9,550,458.

(60) Provisional application No. 62/171,780, filed on Jun. 5, 2015.

(51) Int. Cl.
| | |
|---|---|
| *B60R 19/48* | (2006.01) |
| *B60R 3/02* | (2006.01) |
| *B60R 3/00* | (2006.01) |
| *B60R 19/42* | (2006.01) |

(52) U.S. Cl.
CPC .............. *B60R 19/48* (2013.01); *B60R 3/002* (2013.01); *B60R 3/02* (2013.01); *B60R 19/42* (2013.01)

(58) Field of Classification Search
CPC ............ B60R 19/48; B60R 19/42; B60R 3/02
USPC .................................................. 280/166, 163
See application file for complete search history.

(56) References Cited

U.S. PATENT DOCUMENTS

| | | | |
|---|---|---|---|
| 7,591 | A | 8/1850 | Burdett |
| 752,031 | A | 2/1904 | Chadwick |
| 955,658 | A | 4/1910 | Mitchell et al. |
| 1,250,604 | A | 12/1917 | Lorenc |
| 1,471,972 | A | 10/1923 | Miller |
| 2,041,640 | A | 5/1936 | Goss |
| 2,122,040 | A | 6/1938 | Machovec |

(Continued)

FOREIGN PATENT DOCUMENTS

| | | |
|---|---|---|
| CA | 2 082 177 | 5/1994 |
| CA | 2 332 193 | 9/2001 |

(Continued)

OTHER PUBLICATIONS

One up Offroad Tranction and Suspension Systems—http://www.oneupoffroad.com/ouoproducts/oneuprailstep.html; screenshot from Nov. 15, 2014 from https://archive.org/web.

(Continued)

*Primary Examiner* — James A Shriver, II
*Assistant Examiner* — Brian L Cassidy
(74) *Attorney, Agent, or Firm* — Knobbe Martens Olson and Bear LLP

(57) ABSTRACT

A retractable step and side bar assembly that can be used for raised vehicles, such as trucks. The retractable step can be configured to provide for significant reach in a deployed position to allow for a user to enter the raised vehicle. Further, in the stowed position the retractable step can be located within the side bar, thereby providing a low profile as well as an enhanced aesthetic appearance.

19 Claims, 15 Drawing Sheets

(56) References Cited

U.S. PATENT DOCUMENTS

| | | | |
|---|---|---|---|
| 2,125,085 A | 7/1938 | Pool | |
| 2,436,961 A | 3/1948 | Gabriel | |
| 2,487,921 A | 11/1949 | Culver | |
| 2,492,068 A | 12/1949 | Schofield et al. | |
| 2,566,401 A | 9/1951 | Bustin | |
| 2,575,615 A | 11/1951 | Crump | |
| 2,583,894 A | 1/1952 | Shuck | |
| 2,669,613 A | 2/1954 | Despard | |
| 2,678,832 A | 5/1954 | Wright | |
| 2,764,422 A * | 9/1956 | McDonald | B60R 3/02 105/447 |
| 2,925,876 A | 2/1960 | Wagner | |
| 3,039,562 A | 6/1962 | Wagner | |
| 3,095,216 A | 6/1963 | Browne | |
| 3,172,499 A | 3/1965 | Stairs | |
| 3,329,443 A | 7/1967 | Lowder et al. | |
| 3,392,990 A | 7/1968 | Wolf | |
| 3,488,066 A | 1/1970 | Hansen | |
| 3,494,634 A | 2/1970 | De Paula | |
| 3,522,396 A | 7/1970 | Norden | |
| 3,528,574 A | 9/1970 | Denner et al. | |
| 3,572,754 A | 3/1971 | Fowler | |
| 3,608,957 A | 9/1971 | Maneck | |
| 3,671,058 A | 6/1972 | Kent | |
| 3,762,742 A | 10/1973 | Bucklen | |
| 3,807,757 A | 4/1974 | Carpenter et al. | |
| 3,833,240 A | 9/1974 | Weiler | |
| 3,865,399 A | 2/1975 | Way | |
| 3,887,217 A | 6/1975 | Thomas | |
| 3,889,997 A | 6/1975 | Schoneck | |
| 3,891,261 A | 6/1975 | Finneman | |
| 3,957,284 A | 5/1976 | Wright | |
| 3,961,809 A | 6/1976 | Clugston | |
| 3,980,319 A | 9/1976 | Kirkpatrick | |
| 3,981,515 A | 9/1976 | Rosborough | |
| 4,020,920 A | 5/1977 | Abbott | |
| 4,068,542 A | 1/1978 | Brand et al. | |
| 4,073,502 A | 2/1978 | Frank et al. | |
| 4,089,538 A | 5/1978 | Eastridge | |
| 4,106,790 A * | 8/1978 | Weiler | B60R 3/02 182/88 |
| 4,110,673 A | 8/1978 | Nagy et al. | |
| 4,116,457 A | 9/1978 | Nerem et al. | |
| 4,164,292 A | 8/1979 | Karkau | |
| 4,174,021 A | 11/1979 | Barlock | |
| 4,180,143 A | 12/1979 | Clugston | |
| 4,185,849 A | 1/1980 | Jaeger | |
| 4,188,889 A | 2/1980 | Favrel | |
| 4,231,583 A | 11/1980 | Learn | |
| 4,424,751 A | 1/1984 | Blochlinger | |
| 4,440,364 A | 4/1984 | Cone et al. | |
| 4,462,486 A | 7/1984 | Dignan | |
| 4,536,004 A | 8/1985 | Brynielsson et al. | |
| 4,542,805 A | 9/1985 | Hamlin et al. | |
| 4,570,962 A | 2/1986 | Chavira | |
| 4,623,160 A | 11/1986 | Trudell | |
| D287,001 S | 12/1986 | Jarvie et al. | |
| 4,679,810 A | 7/1987 | Kimball | |
| D292,904 S | 11/1987 | Bielby | |
| 4,720,116 A | 1/1988 | Williams et al. | |
| 4,733,752 A | 3/1988 | Sklar | |
| 4,909,700 A | 3/1990 | Fontecchio et al. | |
| 4,982,974 A | 1/1991 | Guidry | |
| 5,005,667 A | 4/1991 | Anderson | |
| 5,005,850 A | 4/1991 | Baughman | |
| 5,039,119 A | 8/1991 | Baughman | |
| 5,085,450 A | 2/1992 | DeHart, Sr. | |
| 5,137,294 A | 8/1992 | Martin | |
| 5,154,125 A | 10/1992 | Renner et al. | |
| 5,195,609 A | 3/1993 | Ham et al. | |
| 5,199,731 A | 4/1993 | Martin | |
| 5,228,707 A | 7/1993 | Yoder | |
| 5,228,761 A | 7/1993 | Huebschen et al. | |
| 5,238,300 A | 8/1993 | Slivon et al. | |
| D340,905 S | 11/1993 | Orth et al. | |
| 5,257,847 A | 11/1993 | Yonehara | |
| 5,284,349 A | 2/1994 | Bruns et al. | |
| 5,286,049 A * | 2/1994 | Khan | B60R 3/002 280/163 |
| 5,342,073 A | 8/1994 | Poole | |
| 5,358,268 A | 10/1994 | Hawkins | |
| 5,375,864 A | 12/1994 | McDaniel | |
| 5,423,463 A | 6/1995 | Weeks | |
| 5,439,342 A | 8/1995 | Hall et al. | |
| 5,462,302 A | 10/1995 | Leitner | |
| 5,478,124 A | 12/1995 | Warrington | |
| 5,498,012 A | 3/1996 | McDaniel et al. | |
| 5,501,475 A | 3/1996 | Bundy | |
| 5,505,476 A | 4/1996 | Maccabee | |
| 5,513,866 A | 5/1996 | Sisson | |
| 5,538,100 A | 7/1996 | Hedley | |
| 5,538,265 A | 7/1996 | Chen et al. | |
| 5,538,269 A | 7/1996 | McDaniel et al. | |
| 5,547,040 A | 8/1996 | Hanser et al. | |
| 5,584,493 A | 12/1996 | Demski et al. | |
| 5,601,300 A | 2/1997 | Fink et al. | |
| 5,697,623 A | 12/1997 | Bermes et al. | |
| 5,697,626 A | 12/1997 | McDaniel | |
| 5,727,840 A | 3/1998 | Ochiai et al. | |
| 5,779,208 A | 7/1998 | McGraw | |
| 5,842,709 A | 12/1998 | Maccabee | |
| 5,897,125 A | 4/1999 | Bundy | |
| 5,941,342 A | 8/1999 | Lee | |
| 5,957,237 A | 9/1999 | Tigner | |
| 6,042,052 A | 3/2000 | Smith et al. | |
| 6,055,780 A | 5/2000 | Yamazaki | |
| 6,082,751 A * | 7/2000 | Hanes | B60R 3/02 280/163 |
| 6,112,152 A | 8/2000 | Tuttle | |
| 6,149,172 A | 11/2000 | Pascoe et al. | |
| 6,168,176 B1 | 1/2001 | Mueller | |
| 6,179,312 B1 | 1/2001 | Paschke et al. | |
| 6,203,040 B1 | 3/2001 | Hutchins | |
| 6,213,486 B1 | 4/2001 | Kunz et al. | |
| 6,264,222 B1 | 7/2001 | Johnston et al. | |
| 6,270,099 B1 | 8/2001 | Farkash | |
| 6,325,397 B1 | 12/2001 | Pascoe | |
| 6,352,295 B1 | 3/2002 | Leitner | |
| 6,375,207 B1 | 4/2002 | Dean et al. | |
| 6,412,799 B1 | 7/2002 | Schrempf | |
| 6,422,342 B1 | 7/2002 | Armstrong et al. | |
| 6,425,572 B1 | 7/2002 | Lehr | |
| 6,430,164 B1 | 8/2002 | Jones et al. | |
| 6,435,534 B1 | 8/2002 | Stone | |
| 6,439,342 B1 | 8/2002 | Boykin | |
| 6,460,915 B1 | 10/2002 | Bedi et al. | |
| 6,511,086 B2 | 1/2003 | Schlicht | |
| 6,513,821 B1 | 2/2003 | Heil | |
| 6,533,303 B1 | 3/2003 | Watson | |
| 6,588,783 B2 | 7/2003 | Fichter | |
| 6,659,484 B2 | 12/2003 | Knodle et al. | |
| 6,663,125 B1 | 12/2003 | Cheng | |
| 6,746,033 B1 | 6/2004 | McDaniel | |
| 6,769,704 B2 | 8/2004 | Cipolla | |
| 6,810,995 B2 | 11/2004 | Warford | |
| 6,812,466 B2 | 11/2004 | O'Connor et al. | |
| 6,830,257 B2 | 12/2004 | Leitner | |
| 6,834,875 B2 | 12/2004 | Leitner | |
| 6,840,526 B2 | 1/2005 | Anderson et al. | |
| 6,874,801 B2 | 4/2005 | Fichter | |
| 6,880,843 B1 | 4/2005 | Greer, Jr. | |
| 6,912,912 B2 | 7/2005 | Reichinger et al. | |
| 6,918,624 B2 | 7/2005 | Miller et al. | |
| 6,926,295 B2 | 8/2005 | Berkebile et al. | |
| 6,938,909 B2 | 9/2005 | Leitner | |
| 6,942,272 B2 | 9/2005 | Livingston | |
| 6,948,903 B2 | 9/2005 | Ablabutyan et al. | |
| 6,951,357 B2 | 10/2005 | Armstrong et al. | |
| 6,955,370 B2 | 10/2005 | Fabiano et al. | |
| 6,959,937 B2 | 11/2005 | Schneider et al. | |
| 6,966,597 B2 | 11/2005 | Tegtmeier | |
| 6,971,652 B2 | 12/2005 | Bobbert et al. | |
| 6,997,469 B2 | 2/2006 | Lanoue et al. | |
| 7,000,932 B2 | 2/2006 | Heil et al. | |

(56) References Cited

U.S. PATENT DOCUMENTS

| | | |
|---|---|---|
| 7,007,961 B2 | 3/2006 | Leitner |
| 7,017,927 B2 | 3/2006 | Henderson et al. |
| 7,055,839 B2 | 6/2006 | Leitner |
| 7,070,194 B2 | 7/2006 | Garland et al. |
| 7,090,276 B1 | 8/2006 | Bruford et al. |
| 7,111,858 B2 | 9/2006 | Manser et al. |
| 7,111,859 B2 | 9/2006 | Kim et al. |
| 7,118,120 B2 | 10/2006 | Lee et al. |
| 7,118,150 B2 | 10/2006 | Bruford et al. |
| 7,185,904 B1 | 3/2007 | Jones |
| 7,219,911 B2 | 5/2007 | Sukonthapanich et al. |
| 7,258,386 B2 | 8/2007 | Leitner |
| 7,287,770 B2 | 10/2007 | Drabant et al. |
| 7,287,771 B2 | 10/2007 | Lee et al. |
| 7,311,320 B2 | 12/2007 | Kuntze et al. |
| 7,318,596 B2 | 1/2008 | Scheuring |
| 7,360,779 B2 | 4/2008 | Crandall |
| 7,367,574 B2 | 5/2008 | Leitner |
| 7,377,531 B2 | 5/2008 | Fabiano et al. |
| 7,380,807 B2 | 6/2008 | Leitner |
| 7,398,985 B2 | 7/2008 | Leitner et al. |
| 7,413,204 B2 | 8/2008 | Leitner |
| 7,413,205 B2 | 8/2008 | Watson |
| 7,413,233 B1 | 8/2008 | Jung |
| 7,416,202 B2 | 8/2008 | Fichter |
| 7,434,825 B2 | 10/2008 | Williams |
| 7,438,305 B2 | 10/2008 | Schulz |
| 7,441,790 B2 | 10/2008 | Lechkun |
| 7,445,221 B2 | 11/2008 | Kobayashi |
| 7,469,916 B2 | 12/2008 | Watson |
| 7,487,986 B2 | 2/2009 | Leitner |
| 7,513,520 B2 | 4/2009 | Okuyama |
| 7,513,565 B2 | 4/2009 | Watson |
| 7,516,703 B2 | 4/2009 | Tazreiter |
| 7,530,619 B1 | 5/2009 | Bruford et al. |
| 7,566,064 B2 | 7/2009 | Leitner et al. |
| 7,584,975 B2 | 9/2009 | Leitner |
| 7,594,672 B2 | 9/2009 | Piotrowski |
| 7,621,546 B2 | 11/2009 | Ross et al. |
| 7,635,247 B2 | 12/2009 | Collins |
| 7,637,519 B2 | 12/2009 | Leitner |
| 7,673,892 B2 | 3/2010 | Kuntze |
| 7,703,784 B2 | 4/2010 | Plavetich |
| 7,712,755 B2 | 5/2010 | Yang et al. |
| 7,717,444 B2 | 5/2010 | Fichter |
| D618,148 S | 6/2010 | Hoppert |
| 7,731,212 B2 | 6/2010 | Storer |
| 7,740,260 B2 | 6/2010 | VanBelle et al. |
| 7,740,261 B2 | 6/2010 | Leitner |
| 7,766,357 B2 | 8/2010 | Arvanites |
| 7,775,536 B2 | 8/2010 | Shumway |
| 7,793,596 B2 | 9/2010 | Hirtenlehner |
| 7,823,896 B2 | 11/2010 | VanBelle |
| D634,687 S | 3/2011 | Vukel |
| 7,900,944 B2 | 3/2011 | Watson |
| 7,909,344 B1 | 3/2011 | Bundy |
| 7,934,737 B2 | 5/2011 | Okada |
| 7,976,042 B2 | 7/2011 | Watson et al. |
| 8,038,164 B2 | 10/2011 | Stahl et al. |
| 8,042,821 B2 | 10/2011 | Yang |
| D649,100 S | 11/2011 | Cheng |
| 8,052,162 B2 | 11/2011 | Yang |
| 8,056,913 B2 | 11/2011 | Kuntze et al. |
| 8,070,173 B2 | 12/2011 | Watson |
| 8,136,826 B2 | 3/2012 | Watson |
| 8,157,277 B2 | 4/2012 | Leitner |
| 8,177,247 B1 | 5/2012 | Carr |
| 8,205,901 B2 | 6/2012 | Yang et al. |
| D665,713 S | 8/2012 | Pochurek et al. |
| 8,262,113 B1 | 9/2012 | Chafey et al. |
| 8,297,635 B2 | 10/2012 | Agoncillo et al. |
| D671,874 S | 12/2012 | Kekich et al. |
| 8,342,550 B2 | 1/2013 | Stickles et al. |
| 8,342,551 B2 | 1/2013 | Watson et al. |
| 8,360,455 B2 | 1/2013 | Leitner et al. |
| D676,368 S | 2/2013 | Cover |
| 8,366,129 B2 | 2/2013 | Salmon |
| 8,382,132 B2 | 2/2013 | Kowalski |
| 8,408,571 B2 | 4/2013 | Leitner et al. |
| 8,419,034 B2 | 4/2013 | Leitner et al. |
| 8,448,967 B2 | 5/2013 | Storer |
| 8,448,968 B1 | 5/2013 | Grote et al. |
| 8,463,953 B2 | 6/2013 | Davis et al. |
| 8,469,380 B2 | 6/2013 | Yang et al. |
| 8,602,431 B1 | 12/2013 | May |
| 8,641,068 B1 | 2/2014 | Bundy |
| 8,662,512 B2 | 3/2014 | May |
| 8,668,217 B2 | 3/2014 | Ziaylek |
| 8,696,005 B2 | 4/2014 | Kim |
| 8,827,293 B1 | 9/2014 | Bundy |
| 8,827,294 B1 | 9/2014 | Leitner |
| 8,833,782 B2 | 9/2014 | Huotari |
| 8,844,957 B2 | 9/2014 | Leitner et al. |
| D720,674 S | 1/2015 | Stanesic et al. |
| 8,936,266 B2 | 1/2015 | Leitner et al. |
| 8,944,451 B2 | 2/2015 | Leitner et al. |
| 8,985,606 B2 | 3/2015 | Fichter |
| 9,156,406 B2 | 10/2015 | Stanesic et al. |
| 9,272,667 B2 | 3/2016 | Smith |
| 9,302,626 B2 | 4/2016 | Leitner et al. |
| 9,308,870 B2 | 4/2016 | Yang |
| 9,346,405 B2 | 5/2016 | Leitner et al. |
| 9,452,713 B2 | 9/2016 | Stickles |
| 9,511,717 B2 | 12/2016 | Smith |
| 9,522,634 B1 | 12/2016 | Smith |
| 9,527,449 B2 | 12/2016 | Smith |
| 9,550,458 B2 | 1/2017 | Smith et al. |
| 9,561,751 B2 | 2/2017 | Leitner et al. |
| 9,701,249 B2 | 7/2017 | Leitner et al. |
| 9,809,172 B2 | 11/2017 | Stanesic et al. |
| 2002/0109446 A1 | 8/2002 | Arnold |
| 2002/0113400 A1* | 8/2002 | Leitner ............... B60R 3/002 280/166 |
| 2002/0130531 A1 | 9/2002 | Leitner |
| 2003/0090081 A1 | 5/2003 | Oakley |
| 2003/0094781 A1 | 5/2003 | Jaramillo et al. |
| 2003/0200700 A1 | 10/2003 | Leitner |
| 2004/0084868 A1* | 5/2004 | Leitner ............... B60R 3/002 280/166 |
| 2004/0207224 A1 | 10/2004 | Miller et al. |
| 2005/0117969 A1 | 6/2005 | Byrne |
| 2005/0146157 A1 | 7/2005 | Leitner |
| 2005/0173886 A1* | 8/2005 | Leitner ............... B60R 3/02 280/166 |
| 2005/0263974 A1* | 12/2005 | Mulder ............... B60R 3/00 280/163 |
| 2006/0125204 A1* | 6/2006 | Leitner ............... B60R 3/02 280/166 |
| 2006/0208449 A1 | 9/2006 | Kuo et al. |
| 2007/0017743 A1 | 1/2007 | Yeh |
| 2008/0034552 A1 | 2/2008 | Nguyen |
| 2008/0084045 A1* | 4/2008 | Filias ............... B60R 3/002 280/166 |
| 2008/0224438 A1 | 9/2008 | Okada |
| 2008/0290626 A1* | 11/2008 | Leitner ............... B60R 3/02 280/166 |
| 2009/0072507 A1* | 3/2009 | Storer ............... B60R 3/00 280/163 |
| 2009/0203247 A1 | 8/2009 | Fifelski et al. |
| 2009/0308688 A1 | 12/2009 | Tayar |
| 2010/0176607 A1* | 7/2010 | Hardy ............... B60R 9/06 293/102 |
| 2010/0194070 A1 | 8/2010 | Stauffer et al. |
| 2012/0025485 A1* | 2/2012 | Yang ............... B60R 3/02 280/166 |
| 2012/0228848 A1 | 9/2012 | Fichter |
| 2013/0221632 A1 | 8/2013 | Higgs et al. |
| 2015/0091270 A1 | 4/2015 | Stanesic |
| 2015/0321612 A1 | 11/2015 | Leitner et al. |
| 2015/0321613 A1 | 11/2015 | Leitner et al. |
| 2016/0031376 A1 | 2/2016 | Stickles |
| 2016/0039346 A1 | 2/2016 | Yang |
| 2016/0288718 A1* | 10/2016 | Hayes ............... B60R 3/02 |

(56) References Cited

U.S. PATENT DOCUMENTS

| | | | |
|---|---|---|---|
| 2017/0008459 A1 | 1/2017 | Leitner et al. | |
| 2017/0246993 A1 | 8/2017 | Smith | |
| 2017/0267182 A1 | 9/2017 | Leitner | |
| 2017/0355315 A1 | 12/2017 | Leitner | |

FOREIGN PATENT DOCUMENTS

| | | |
|---|---|---|
| CN | ZL93247906.6 | 6/1994 |
| CN | 201280106 Y | 7/2009 |
| CN | 202758405 U | 2/2013 |
| CN | 202847566 U | 4/2013 |
| CN | 103149915 A | 6/2013 |
| DE | 31 51 621 | 7/1983 |
| DE | 39 32 142 | 4/1990 |
| DE | 8910933 U1 | 10/1990 |
| EP | 0 066 493 | 12/1982 |
| EP | 1 116 840 | 7/2001 |
| EP | 3 002 157 | 4/2016 |
| GB | 934387 | 8/1963 |
| GB | 2 045 699 | 11/1980 |
| GB | 2 129 378 | 5/1984 |
| GB | 2 201 511 | 9/1988 |
| GB | 2 288 014 | 10/1994 |
| JP | 63-255144 | 10/1988 |
| JP | 04-339040 | 11/1992 |
| JP | 04-342629 A1 | 11/1992 |
| JP | 05-310061 | 11/1993 |
| JP | 05-310081 | 11/1993 |
| SU | 403594 | 11/1972 |
| TW | M296187 | 8/2006 |
| TW | M318551 | 9/2007 |
| WO | WO 2001/000441 | 1/2001 |
| WO | WO 2003/039910 | 5/2003 |
| WO | WO 2003/039920 | 5/2003 |
| WO | WO 2003/066380 | 8/2003 |
| WO | WO 2003/069294 | 8/2003 |
| WO | WO 2006/050297 | 5/2006 |
| WO | WO 2009/103163 | 8/2009 |

OTHER PUBLICATIONS

One Up Offroad—One Up Step Installation, Introducing the New Patent Pending One Up Step dated Nov. 30, 2007.

One Up Offroad—One Up Step Installation, Instructions Part 2, Power Step Installation to One Up Step dated Nov. 30, 2007.

One Up Offroad—New Product Release, Introducing the New Patent Pending Design—One up Step dated Jan. 24, 2008.

* cited by examiner

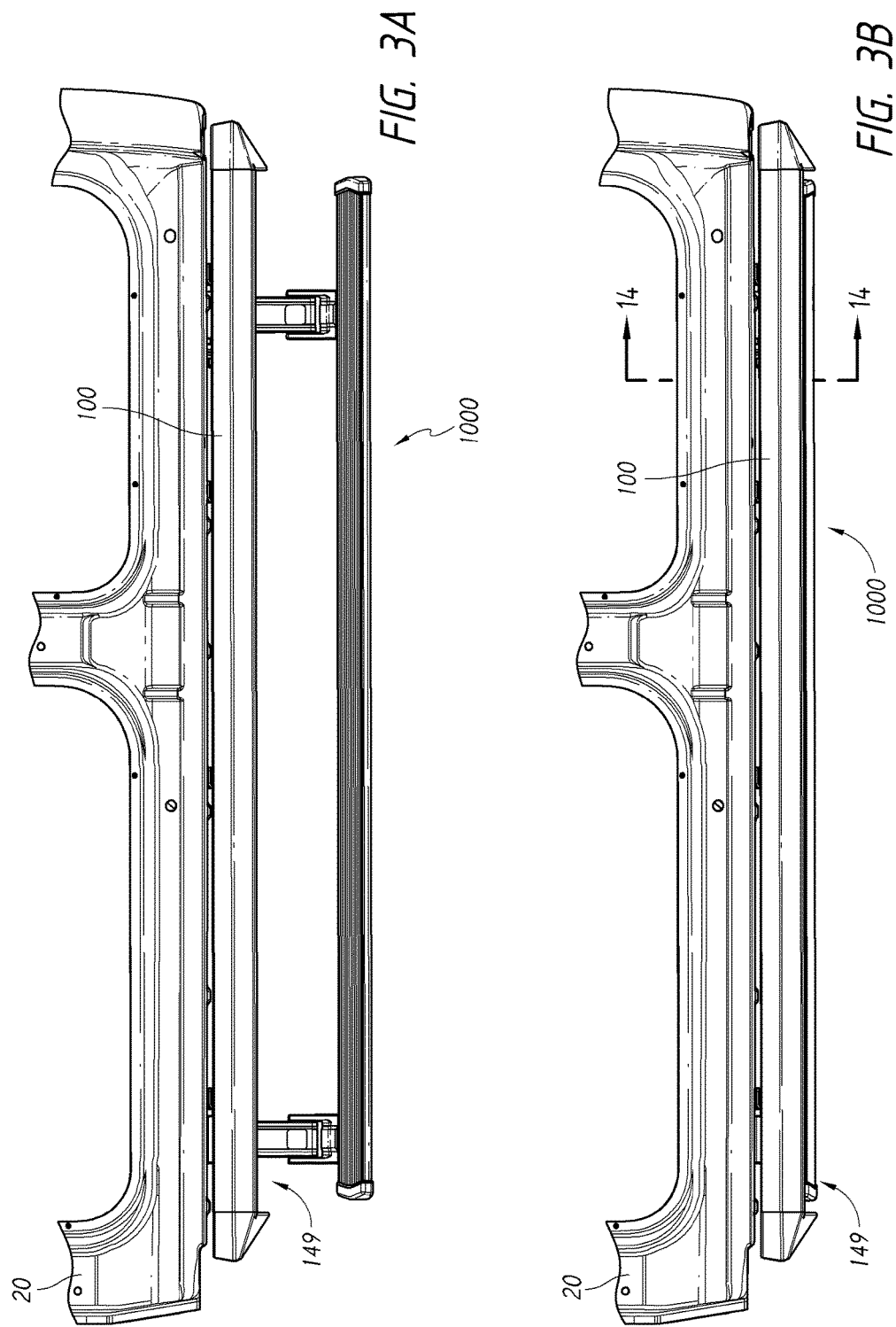

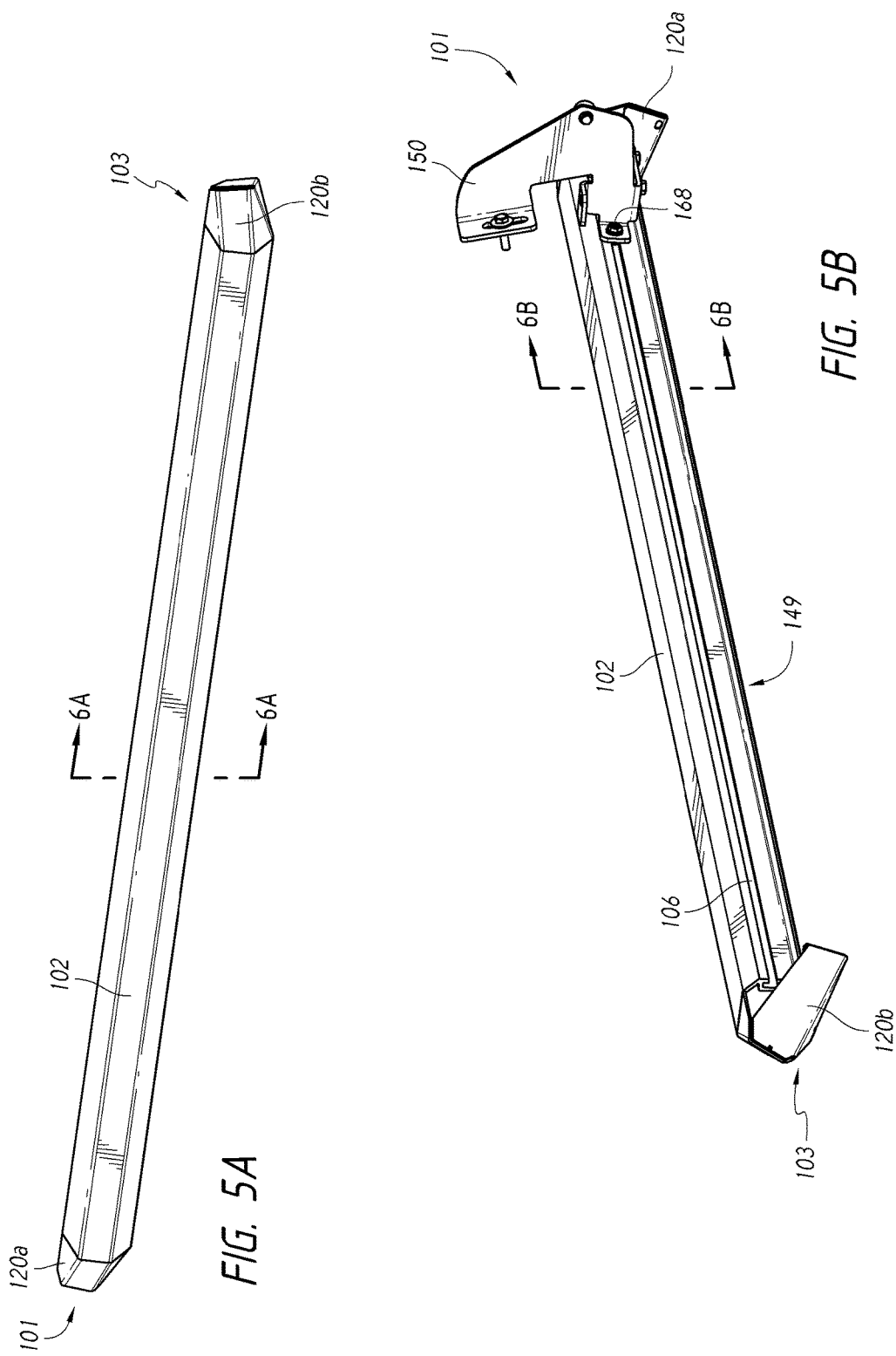

RETRACTABLE STEP AND SIDE BAR ASSEMBLY FOR RAISED VEHICLE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

This disclosure relates generally to a retractable step and side bar assembly for a raised vehicle.

Description of the Related Art

Many types of vehicles, including sport utility vehicles (e.g. JEEP® brand vehicles), pickup trucks, and vans, are raised off the ground farther than normal passenger automobiles. The increased height of the floor of the passenger cab from the ground makes it difficult to enter and exit these vehicles.

In addition, if the vehicles are driven over rough terrain, their lower body panels and door panels are susceptible to being scratched, dented, or otherwise damaged by rocks or other ground debris. To address this issue, the nerf bars or rock rails can function to protect the body of the vehicles from being damaged from below. Moreover, nerf bars can be mounted to the vehicle to provide a stepping surface to assist the driver and passengers in entering and exiting these vehicles.

SUMMARY

Typically, running boards, side bars, and/or nerf bars are used to help a user access a vehicle. Further, these side bars can provide for enhanced aesthetics of the vehicle. However, the side bars can have significant limitations as side bars sit too high because of necessary ground and side clearance. This creates a stepping platform positioned too high and too inboard, thus creating an awkward ingress/egress for a user. That being said, it is desirable to keep the aesthetics of the side bars while still providing ease of access for a user to enter a vehicle.

Accordingly, embodiments of the disclosure allow for a user to lower an additional step to a low, functional stepping height to get in and out of the vehicle, yet stow them to the higher position for vehicle operation behind the side bar, creating the necessary ground clearance while also improving the vehicle aesthetics.

Moreover, many users enjoy the aesthetics of nerf bars without needing the structural support of the nerf bars. Accordingly, disclosed herein are side bars that can be used as aesthetic replacements for the nerf bars, without requiring the structural support they provide. As disclosed in detail below, they can be used in conjunction with a retractable step to provide for advantageous aesthetics for a raised vehicle while still assisting a user enter and exit the vehicle.

One area where standard deployable running boards fall short is on the more extreme vehicles, lifted higher than the typical truck. For such vehicles, it has been recognized that it would be desirable for the step to be deployed even lower than the linkage packaging allows. An embodiment that combines the side bar and vehicle step assembly allows one to stow the boards at an even lower level, without compromising the aesthetics, and desirably also allows the boards to be deployed to a lower level. Simply said, a lower stowed position facilitates a lower deployed position, and doing this in combination with the side bar accomplishes this while still looking good.

Disclosed herein are embodiments of a combination side bar and vehicle step assembly, the assembly comprising a side bar configured to be mounted to a vehicle by at least one mounting bracket defining a mounting surface configured to mate with the vehicle and an extendable vehicle step comprising a stepping platform connected to at least one pair of arms, the at least one pair of arms connected to a frame, the frame being connected to the at least one mounting bracket, wherein the extendable vehicle step is movable between a stored and a deployed position, where the vehicle step is in the deployed position below and outboard to the side bar, and when the extendable vehicle step is in the deployed position, the stepping platform is at least partially outboard to the side bar.

In some embodiments, when the extendable vehicle step is in the stored position, the stepping platform can be at least partially inboard from the mounting surface.

Also disclosed herein are embodiments of a combination side bar and vehicle step assembly, the assembly comprising a side bar configured to be mounted to a vehicle by at least one mounting bracket defining a mounting surface configured to mate with the vehicle, and an extendable vehicle step having a distal end, the extendable step comprising a stepping platform connected to at least one pair of arms, the at least one pair of arms connected to a frame, the frame being connected to the at least one mounting bracket, wherein the extendable vehicle step is movable between a stored and a deployed position, and the vehicle step is in the deployed position below and outboard of the side bar, and wherein the side bar comprises a channel on a lower surface, the channel sized and configured to at least partially enclose the extendable vehicle step in the stored position.

Also disclosed herein are embodiments of a vehicle assembly, the assembly comprising a vehicle having a first door and a side bar connected to the vehicle by at least one mounting bracket, the side bar positioned external to the first door, and an extendable vehicle step, the extendable step comprising a stepping platform connected to at least one pair of arms, the at least one pair of arms connected to a frame, the frame being connected to the at least one mounting bracket such that the extendable vehicle step is positioned external to the at first door, the vehicle step defining a distal end, wherein the extendable vehicle step is movable between a stored and a deployed position, and the vehicle step is in the deployed position below and outboard of the side bar, and wherein the side bar comprises a channel on a lower surface, the channel sized and configured to at least partially cover the distal end of the extendable vehicle step in the stored position.

In some embodiments, a length of the side bar can be at least ¾ a width of the first door and a length of the stepping platform can be at least ½ the width of the first door. In some embodiments, a length of the side bar can be at least a width of the first door and a length of the stepping platform can be at least ½ the width of the first one door. In some embodiments, a length of the side bar and a length of the stepping platform can be at least a width of the first door.

In some embodiments, the extendable vehicle step can be self-energizing. In some embodiments, a plurality of mounting brackets can be configured to connect the side bar to the vehicle.

Also disclosed herein is a vehicle assembly, the assembly comprising a vehicle having a first door and a side bar connected to the vehicle by at least one mounting bracket, the side bar positioned external to the first door, and an extendable vehicle step, the extendable step comprising a stepping platform connected to at least one pair of arms, the at least one pair of arms connected to a frame, the frame being connected to the at least one mounting bracket such that the extendable vehicle step is positioned external to the at first door, wherein the extendable vehicle step is movable between a stored and a deployed position, where the vehicle step is in the deployed position below and outboard of the side bar, and wherein the frame is configured to be located at least partially below a body of the vehicle.

In some embodiments, the frame can be configured to be located fully below the body of the vehicle.

Also disclosed herein is a vehicle assembly, the assembly comprising a vehicle having a first door and a side bar, the side bar comprising a longitudinal opening generally facing towards the vehicle, at least one mounting bracket, the at least one mounting bracket having a first end configured to attached to a body of the vehicle a second end configured to attach to the side bar, a fastener coupling the at least one mounting bracket to the side bar, the fastener configured to extend into and be retained within the longitudinal opening, and an extendable vehicle step, the extendable step comprising a stepping platform connected to at least one pair of arms, the at least one pair of arms connected to a frame, the frame being connected to the at least one mounting bracket such that the extendable vehicle step is positioned external of the at first door, wherein the extendable vehicle step is movable between a stored and a deployed position, where the vehicle step is in the deployed position below and in front of the side bar, and wherein the side bar is configured to be translatable with respect to the at least one mounting bracket by sliding the fastener through the longitudinal opening.

BRIEF DESCRIPTION OF THE DRAWINGS

FIG. 3A illustrates a front view of an embodiment of a combination of a side bar and stepping structure in the deployed position.

FIG. 3B illustrates a front view of an embodiment of a combination of a side bar and stepping structure in the stowed position.

FIG. 5A illustrates a front view of an embodiment of a side bar.

FIG. 5B illustrates a back view of an embodiment of a side bar.

DETAILED DESCRIPTION

Figure 1:
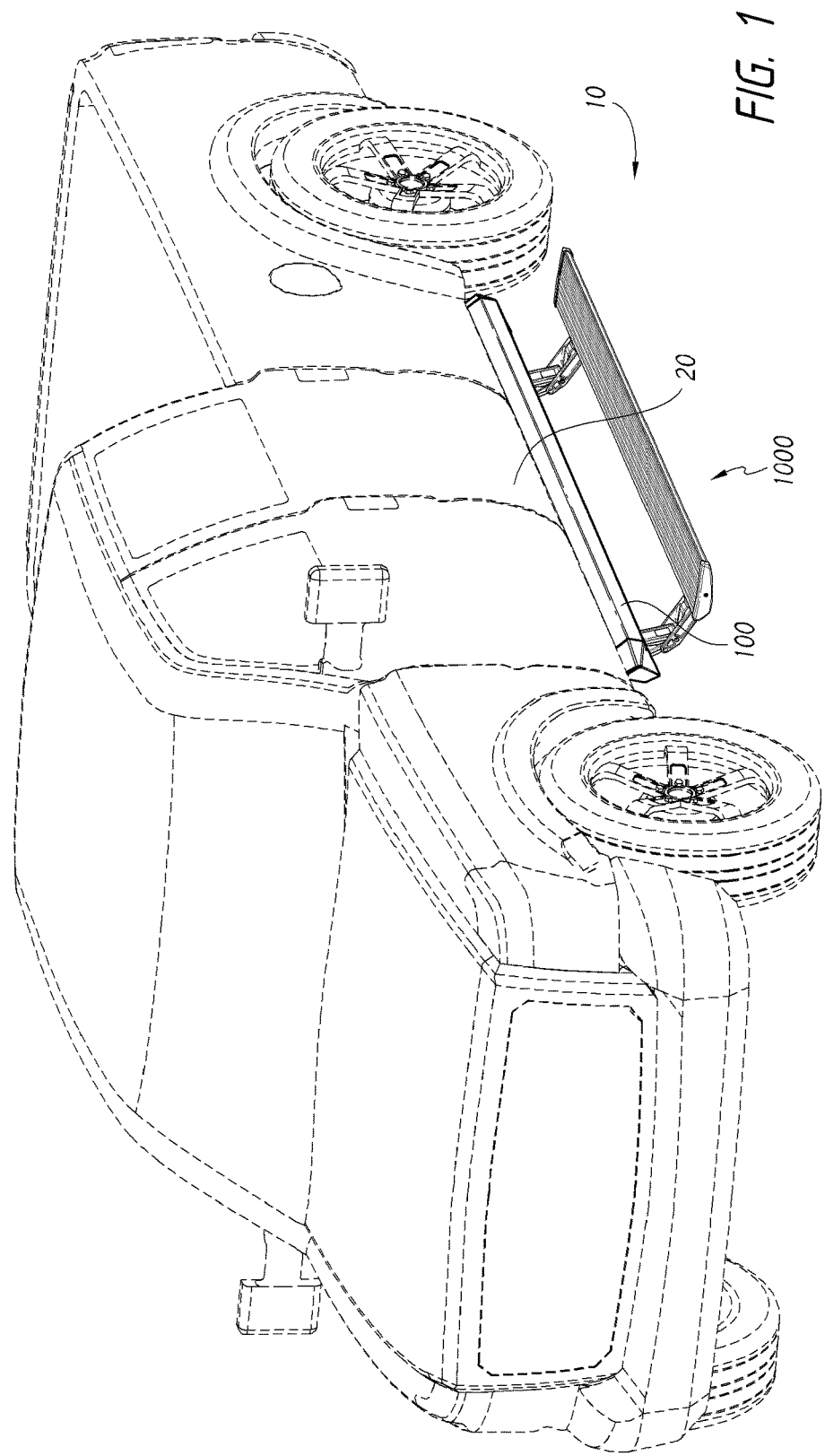
FIG. 1 illustrates an embodiment of a combination of a side bar and stepping structure in the deployed position.
Figure 2:
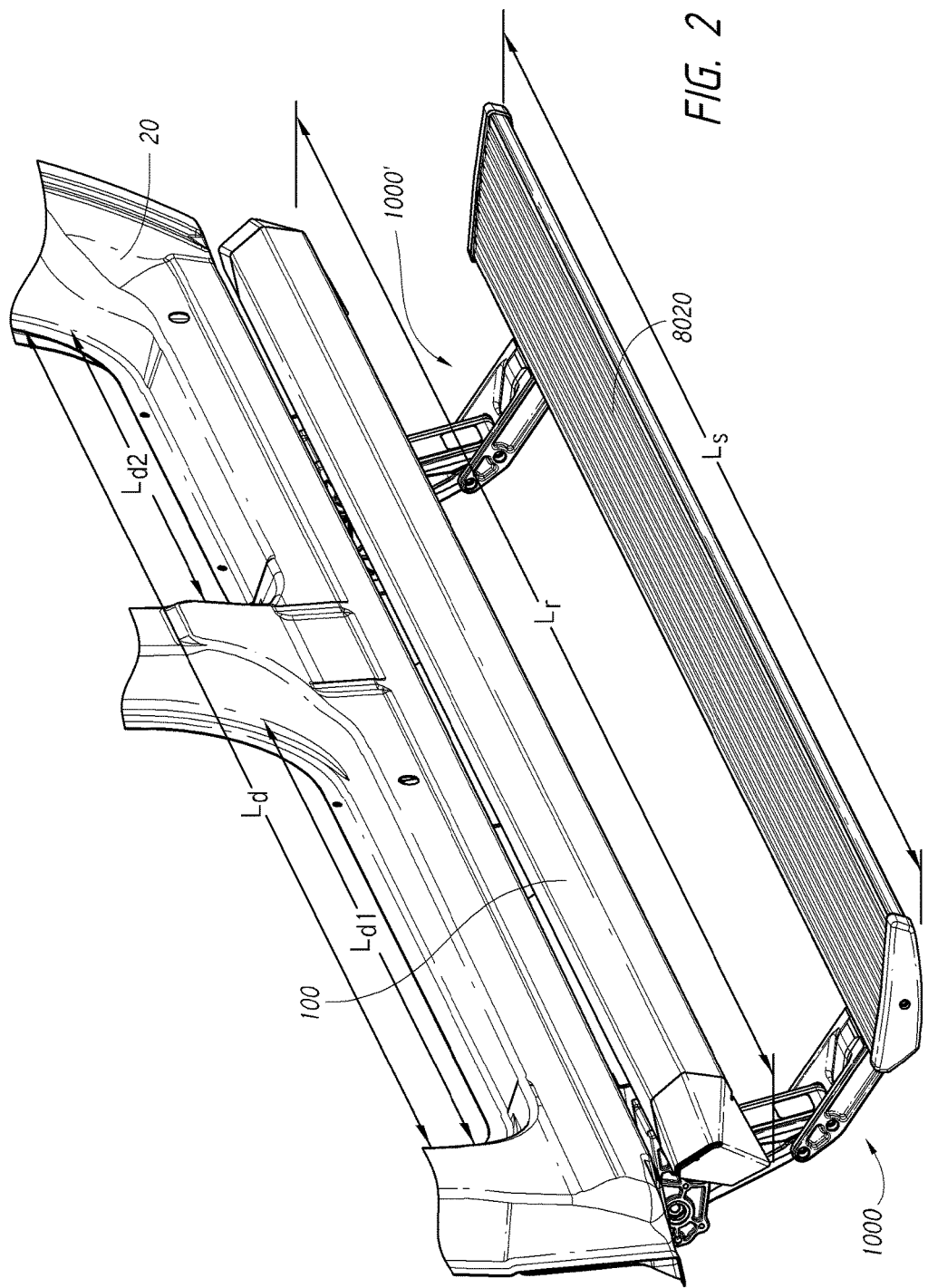
FIG. 2 illustrates an angled view of an embodiment of a combination of a side bar and stepping structure in the deployed position.

Disclosed herein are combinations of a stepping structure with a side bar, in particular for use on the sides of vehicles. The side bar and step combination can be uniquely formed to provide for a low profile in the retracted position, where the step is minimized exposed below the side bar, while also having significant reach in the deployed position to allow for a user to easily use the step to access the vehicle itself. The combination of the side bar 100 and step 1000, forming a combination assembly 10, attached to a vehicle 20 is shown in FIGS. 1-2. Further, FIGS. 3A-B show the combination assembly 10 in the deployed (FIG. 3A) and the stowed (FIG. 3B) positions. As shown, the combination assembly 10 advantageously allows for the step 1000 to be partially hidden by the side bar 100 when in the stowed position, improving overall aesthetics of the combination assembly 10. However, the combination assembly 10 is usable with many other types of vehicles, for example standard cab pickup trucks, extended cab pickup trucks, and sport utility vehicles such as JEEP® brand vehicles, and the type of vehicle does not limit the disclosure.

Side Bar

As shown in the previous figures, the side bar 100 can be attached to a vehicle 20, generally on the underside of the frame. The side bar 100 can extend generally away from the frame of the vehicle 20 (e.g., outboard). In some embodiments, the side bar 100 can includes a side bar main body 102 configured for mounting to vehicle 20 via mounting brackets 150.

Figure 4A:
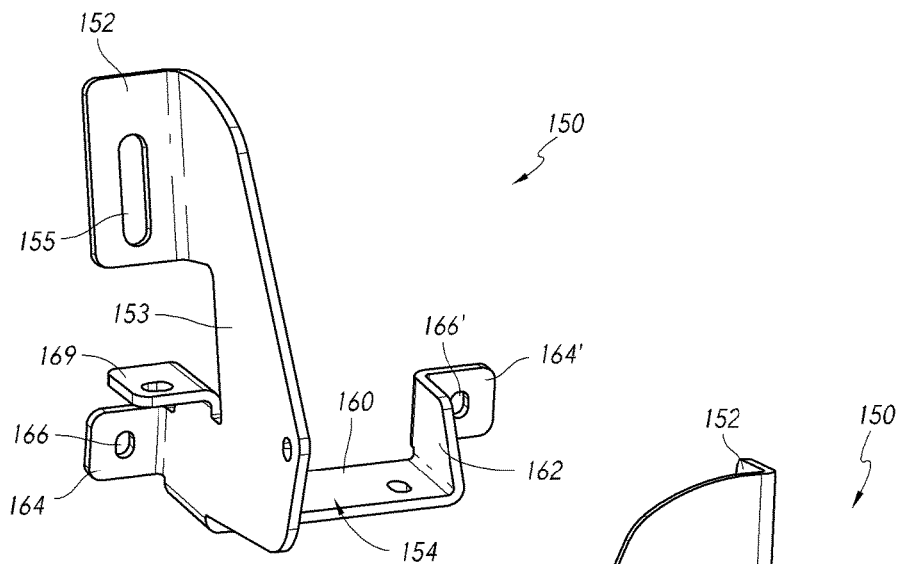
FIG. 4A-C illustrates views of an embodiment of a mounting structure.
Figure 4B:
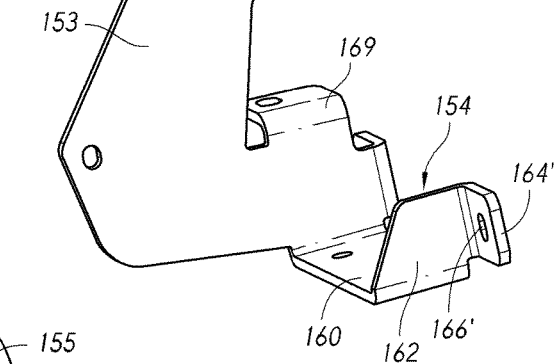
Figure 4C:
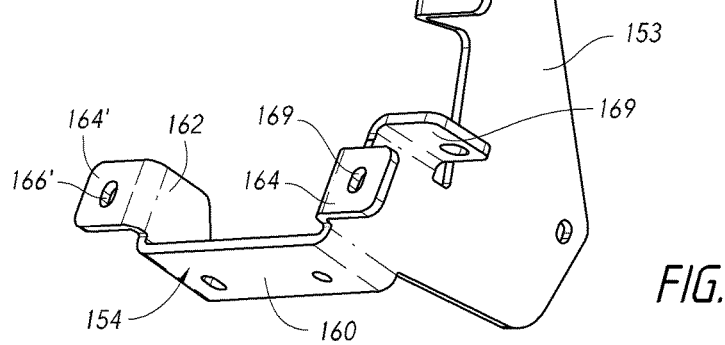

The mounting bracket 150, shown in FIGS. 4A-C, can have a generally c-shaped structure having vehicle attachment portion 152, a body 153, and a side bar attachment portion 154. The vehicle attachment portion 152 can be generally the top of a c-shape structure, while the side bar attachment portion 154 can be generally the bottom. The body 153 can connect the vehicle attachment portion 152 to the side bar attachment portion 154.

Figure 13:
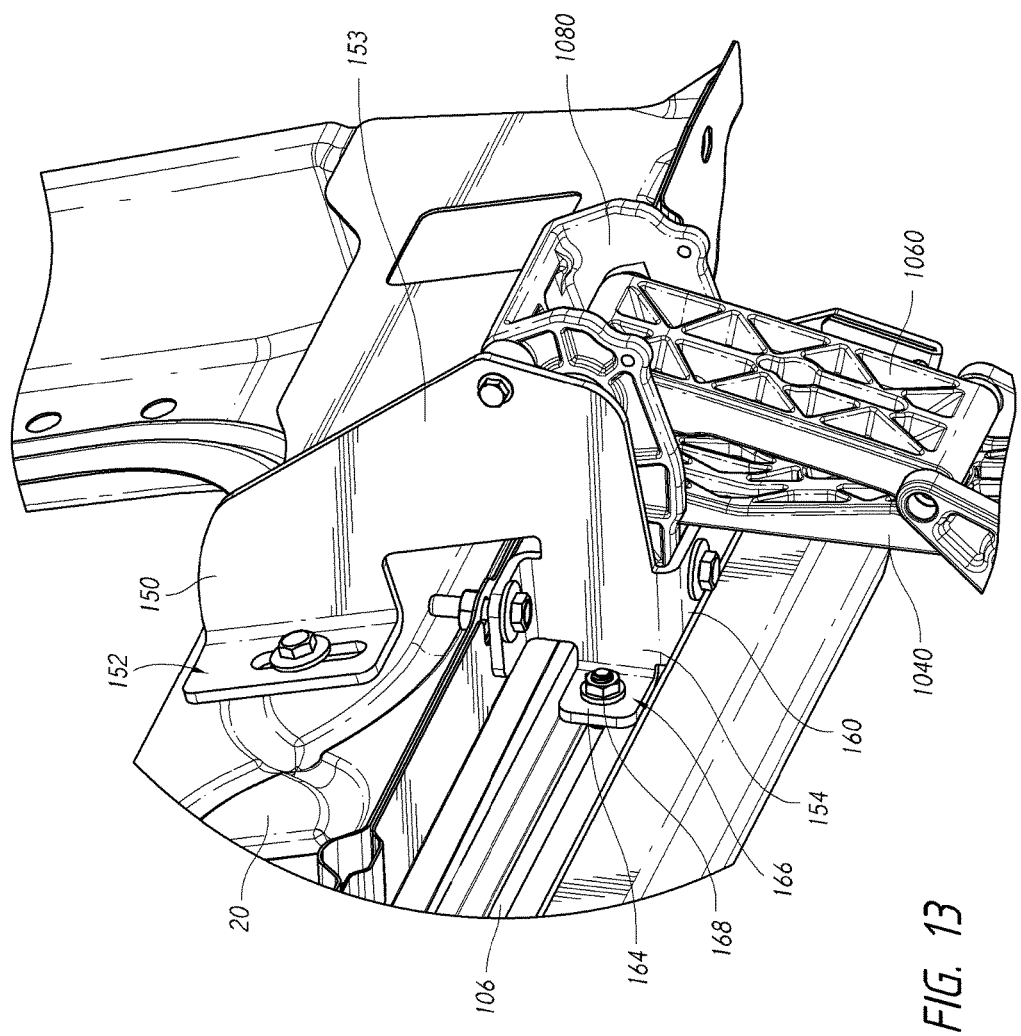
FIG. 13 illustrates the attachment of an embodiment of a combination of a side bar and stepping structure attached to a vehicle.

The vehicle attachment portion 152 can be generally configured to be located above the side bar attachment portion 154, and can be located generally on the inside surface of the body of vehicle 20. The vehicle attachment portion 152 can be configured to be mounted onto the vehicle 20, such as through an aperture 155, thereby keeping the mounting bracket 150 in place. The attachment portion 152 can extend perpendicularly from the body 153 to form a flange or mounting surface which can mate with vehicle 20 where the aperture 155 can be located. In some embodiments, the vehicle attachment portion 152 can have a greater thickness than the body 153. Thus, as discussed, the mounting bracket 150 is configured to mate with portions of the vehicle body (such as shown in FIG. 13) and secure the bracket 150 in both a vertical direction and a horizontal direction with respect to the ground. Thus can be done through the use of fasteners or welding, though the attachment means does not limit the disclosure. It is noted that the configuration of the mounting bracket 150 can be adjusted to match the mounting requirements of a particular vehicle.

The side bar attachment portion 154 can be configured to be attached to the side bar 100. As shown in FIGS. 4A-C, the side bar attachment portion 154 can be formed by a plurality of surfaces. A base surface 160 can be formed generally on the bottom of the mounting bracket 150, extending generally perpendicular to the bottom of the body 153. The base surface 160 can be configured to slide against a surface of the side bar 100, discussed below, in some embodiments. Further, attached to the base surface 160 and extending upwards and generally parallel to the body 153 is the secondary surface 162. Extending perpendicular to the front end of the body 153 and secondary surface 162 are a pair for attachment surfaces 164/164'. These attachment surfaces 164/164' can have at least one aperture 166/166' extending therethrough. Accordingly, in some embodiments a fastener, 168, such as a bolt, screw, or other member can extend through the aperture 166/166', allowing it to connect to the side bar 100, as discussed in detail below. In some embodiments, a frame surface 169 can extend away from the body 153 generally parallel to the base surface 160 but in the opposite direction. This surface can be configured to attach to a frame of a vehicle 20.

In some embodiments, a plurality of mounting brackets 150 can be used to attach the side bar 100 to the vehicle 20. In some embodiments, the mounting brackets 150 can be spaced apart at a particular distance, though the spacing does not limit the disclosure.

Figure 6A:
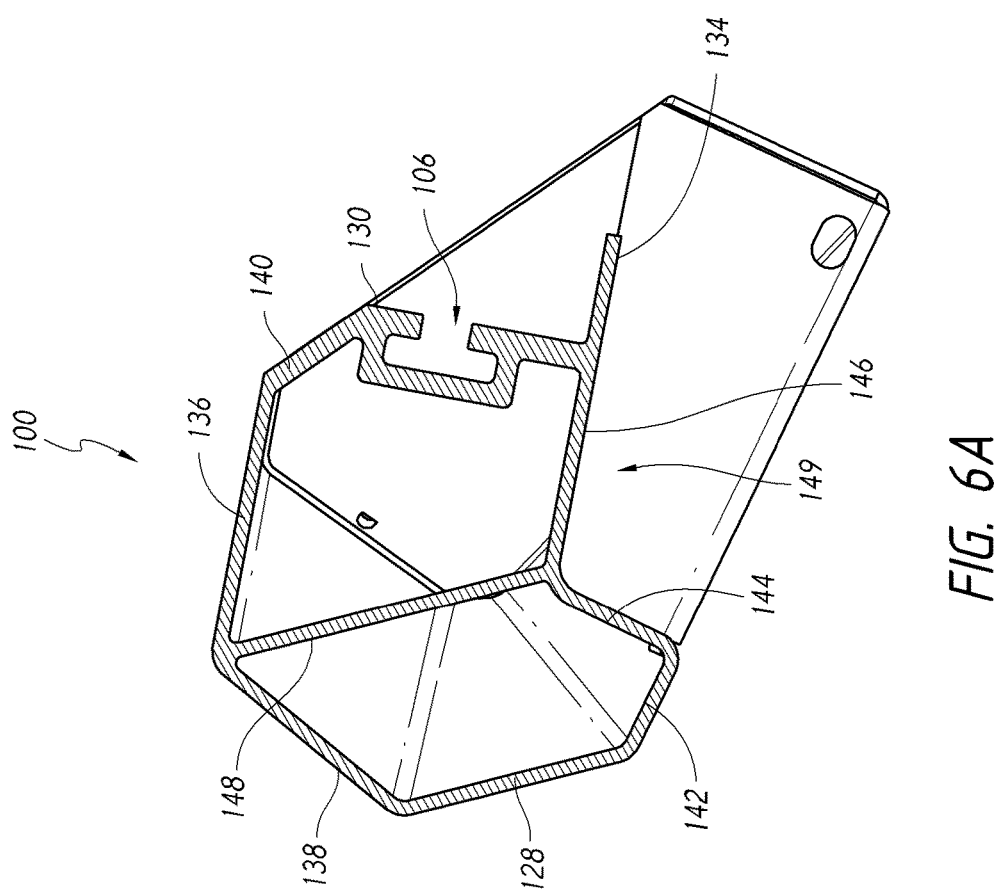
FIG. 6A illustrates a cross-sectional view of an embodiment of a side bar.

As shown in FIGS. 5A-B, side bar main body 102 itself can extend from a first end 101 to a second end 103. It can be defined by a plurality of walls, each wall having and/or defining outer and inner surfaces that additionally extend from the first to the second end 101/103. As shown in the cross section of FIG. 6A, the side bar main body 102 can have a front wall 128 and a back wall 130, which face away from and towards the vehicle 120, respectively. The back wall 130 can have a channel formed therein to define an opening 106, described in detail below. Further, below the back wall 130 there can be an extension wall 134 which extends generally perpendicular to the back wall 130 and extends farther than the back wall 130, and the extension wall 134 can be in contact with the base wall 160 of the mounting bracket 150, and can help to support the mounting bracket 150. Further, the side bar main body 102 can have a top wall 136. As shown in the figures, the top wall 136 can be connected to the front and back walls 130/132 by angled or connection walls 138/140.

In addition, the side bar main body 102 can have a bottom wall 142 connected to the front wall 130. Connecting the bottom wall 142 and the back wall 130 are two walls that meet at an approximately perpendicular angle, thus forming a channel 149 on generally the bottom-back side of the side bar main body 102. The step distal end facing or vertical wall 144 can be generally parallel to the back wall 130 and connected to the bottom wall 130. The stepping member facing or horizontal wall 146 can extend from the vertical wall 144 to the back wall 130. In some embodiments, the horizontal wall 146 extends beyond the back wall 130, thus forming the extension wall 134. Thus, the vertical and horizontal walls 144/146 form the channel 149 in the side bar main body 102. The channel 149 can be sized and configured to receive at least a portion of the step 200, as discussed in detail below, thus providing for aesthetic improvements, as well as improved clearance.

While a particular shape of the side bar main body 102 is shown and discussed, it will be known that the particular size and dimensions of the side bar main body 102 does not limit the disclosure. Further, the walls disclosed may change shape throughout the length of the side bar main body 102.

In some embodiments, an internal connection wall 148 can be used to strengthen the side bar main body 102. In some embodiments, the side bar main body 102 is hollow. In some embodiments, the side bar main body 102 is solid and filled/or in with another material.

Figure 6B:
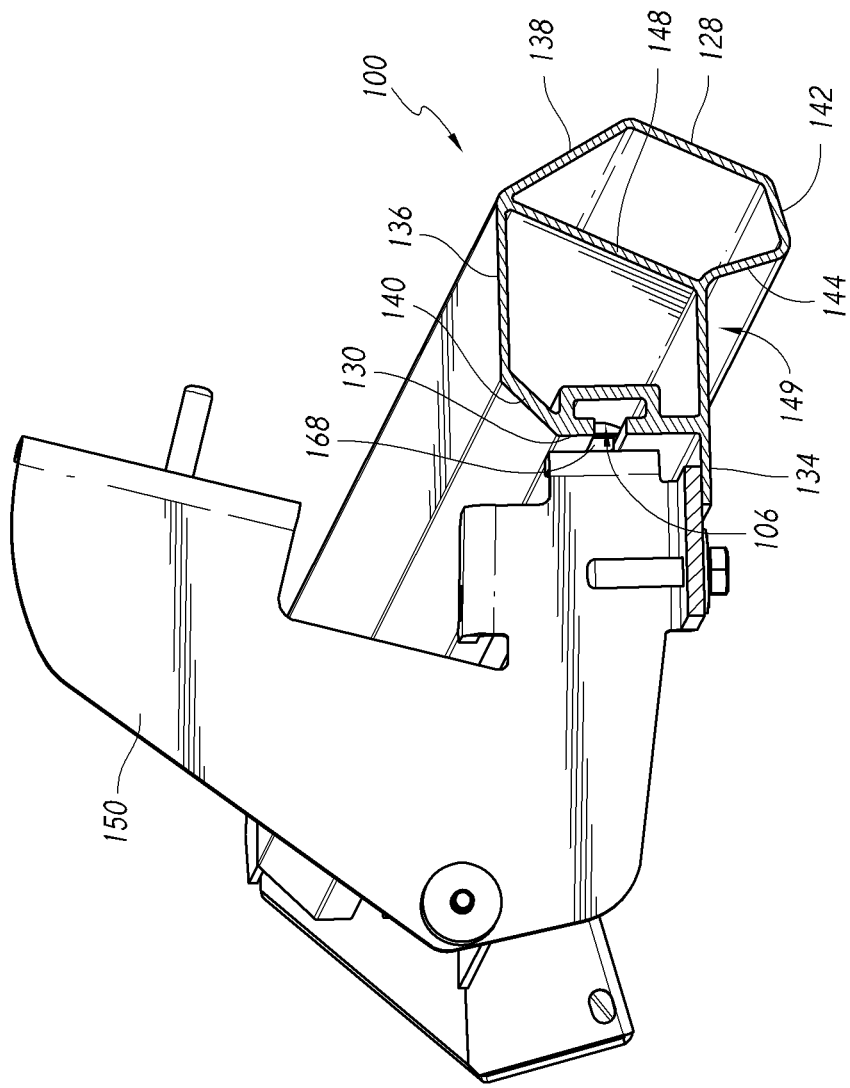
FIG. 6B illustrates a cross-sectional view of an embodiment of a side bar attached to an embodiment of a mounting bracket.

In some embodiments, the side bar main body 102 extends between a first end 101 and a second end 103 and is formed to have a channel-shape defining a longitudinal opening 106 extending at least partially between the first and second ends 101/103 of the back wall 130 of the side bar main body 102. The longitudinal opening 106 can extend partially into the back wall 130 to retain a fastener. In some embodiments, the longitudinal opening 106 can extend the full length of the side bar main body 102, and thus be open at the first and second ends 101/103. In some embodiments, the longitudinal opening 106 only extends partially along the length of the side bar main body 102, thereby being closed at either the first or second ends 101/103, or both. As shown in FIG. 6B, the longitudinal opening 106 can be sized and configured to receive and retain a fastener 168 that protrudes through the apertures 166/166' of the mounting bracket 150. Thus, the side bar 100 can be attached to the mounting bracket 150. In some embodiments, the fasteners 168 can be configured to be tightened within the longitudinal opening 106. Therefore, the side bar 100 can be moved with respect to the mounting bracket 150, and thus vehicle 20, allowing for the position of the side bar 100 to be adjusted. Accordingly, when the side bar 100 is in the desired position, the fasteners 168 can be tightened, thus stopping motion of the side bar 100 with respect to the mounting bracket 150.

In some embodiments, such as shown in FIGS. 5A-B, the side bar main body 102 may be provided with a first end cap 120 $a$ connected to the first end 101 of the side bar main body 102 and a second end cap 120 $b$ connected to the second end 103 of the side bar main body 102. In some embodiments, the end caps 120 $a$, 120 $b$ (collectively referred to as 120) can be mirror images of each other and are shaped to match the cross-sectional profile of the side bar main body 102. In some embodiments, the end caps 120 may have a greater dimension than the side bar main body 102, thereby providing end coverings of the channel 149. In the embodiment shown, the end caps 120 are welded to the side bar main body 102. However, other connections means are certainly possible, such as the use of fasteners.

Referring back to FIG. 2, in some embodiments, the side bar 100 length (Lr) can extend at least half of a length of the vehicle 20. In some embodiments, the side bar 100 length (Lr) can extend at least ¾ of a length of the vehicle 20. In some embodiments, the side bar 100 length (Lr) can extend at least half of a length of a door ($L_{d1}$ or $L_{d2}$) on one side of the vehicle 20. In some embodiments, the side bar 100 length (Lr) can extend at least ¾ of a length of a door ($L_{d1}$ or $L_{d2}$) on one side of the vehicle 20. In some embodiments, the side bar 100 length (Lr) can extend at least a length of a door ($L_{d1}$ or $L_{d2}$) on one side of the vehicle 20. In some embodiments, the side bar 100 length (Lr) can extend at least half of a length of two doors (Ld) on one side of the vehicle 20. In some embodiments, the side bar 100 length (Lr) can extend at least ¾ of a length of two doors (Ld) on one side of the vehicle 20. In some embodiments, the side bar 100 length (Lr) can extend at least a length of two doors (Ld) on one side of the vehicle 20. In some embodiments, the side bar 100 length (Lr) can extend about 2, 3, 4, 5, 6, 7, or 8 feet. In some embodiments, the side bar 100 length (Lr) can extend at least about 2, 3, 4, 5, 6, 7, or 8 feet.

In some embodiments, the side bar main body 102 may be formed from an initially flat sheet, for example a flat sheet of about 11 gauge steel. Other sheet thicknesses may also be used, and the particular thickness does not limit the disclosure. The side bar main body 102 may be formed by other processes as well, for example by stamping, casting, or extrusion, and the particular method of manufacturing does not limit the disclosure.

In some embodiments, the side bar 100 may be a modular side bar as discussed in U.S. Pat. App. No. 2015/0091270, hereby incorporated by reference in its entirety.

Stepping Structure

Figure 7:
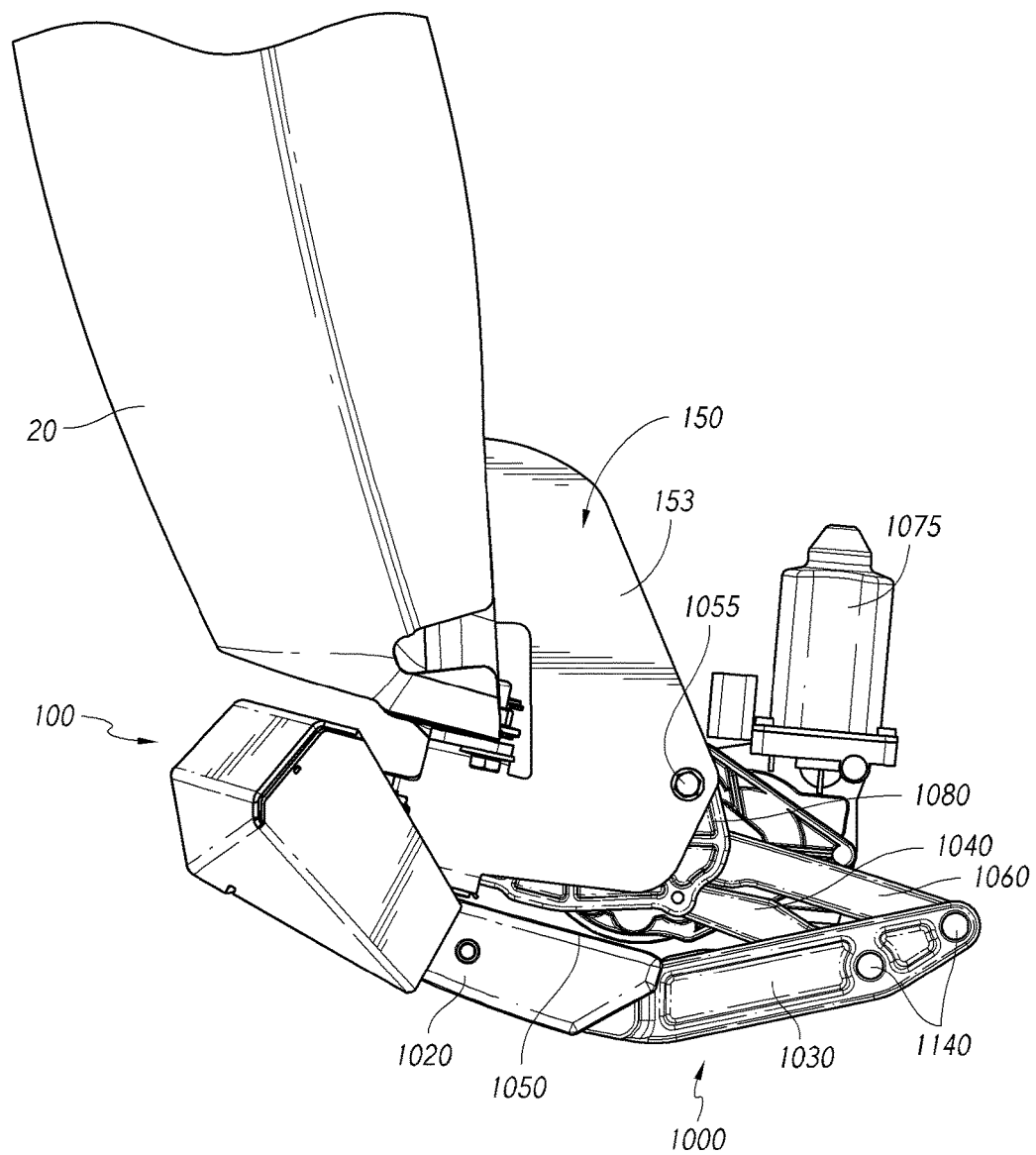
FIG. 7 illustrates an embodiment of a combination of a side bar and stepping structure in the stowed position.
Figure 8:
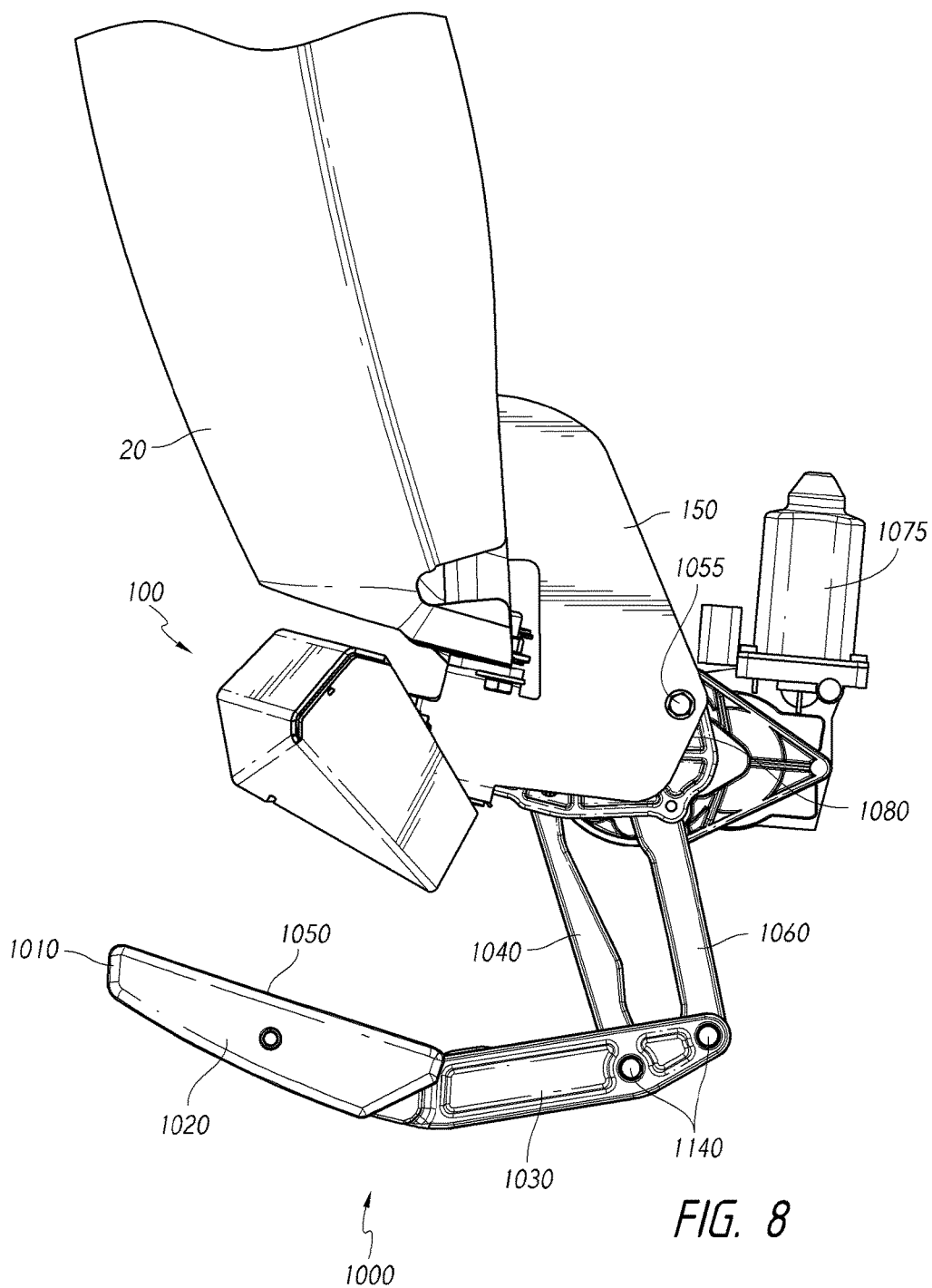
FIG. 8 illustrates an embodiment of a combination of a side bar and stepping structure in the intermediate position.

FIG. 1 additionally illustrates an embodiment of such a vehicle step 1000 that can be used in conjunction with the side bar 100 to form the combination assembly 10. FIG. 7 illustrates the vehicle step 1000 in a stowed position. As shown, the vehicle step 1000 can be composed of numerous components, further discussed below, which can allow for translation of the vehicle step 1000 from a stowed position (FIG. 7) through an intermediate position (FIG. 8) and to a deployed position (FIG. 9) and back again, and can help a user to enter and exit a vehicle. In some embodiments, the vehicle step 1000 can be located under a vehicle door, such as the front or back doors, or below the trunk, though the particular location of the vehicle step 1000 is not limiting. In some embodiments, the vehicle step 1000 can move to the deployed position when a vehicle door is opened and move to a stowed position when an open vehicle door is closed. In some embodiments, the vehicle step 1000 can be moved manually. In some embodiments, the vehicle step 1000 can move through the press of a button or activation of a switch, and can operate independently of motion of a vehicle door, such as disclosed in U.S. patent application Ser. No. 14/169,626, published as U.S. 2015/0123374 A1, hereby incorporated by reference in its entirety.

As shown, the vehicle step 1000 can contain a stepping platform 1020. The stepping platform 1020 can extend generally parallel to the ground and can be configured for a user to step on to allow for access into a vehicle. The stepping platform 1020 can be sized to generally receive a user's foot in some embodiments. Thus, a plurality of different stepping platforms 1020 can be used for different parts of a vehicle. In some embodiments, the stepping platform 1020 can extend along a substantial length of a vehicle, such as to be configured like a bar as shown in FIG. 2. Accordingly, in some embodiments only a single stepping platform 1020 is used on each side of the vehicle for the bar-like configuration. In some embodiments, the stepping platform 1020 can be generally the same length as the side bar 100. In some embodiments, the stepping platform 1020 can have a smaller length than the side bar 100. In some embodiments, the stepping platform 1020 can have gripping or high friction material on its upper side to help a user enter a vehicle.

Referring back to FIG. 2, in some embodiments, the stepping platform 1020 length (Ls) can extend at least half of a length of the vehicle 20. In some embodiments, the stepping platform 1020 length (Ls) can extend at least ¾ of a length of the vehicle 20. In some embodiments, the stepping platform 1020 length (Ls) can extend at least half of a length of a door ($L_{d1}$ or $L_{d2}$) on one side of the vehicle 20. In some embodiments, the stepping platform 1020 length (Ls) can extend at least ¾ of a length of a door ($L_{d1}$ or $L_{d2}$) on one side of the vehicle 20. In some embodiments, the stepping platform 1020 length (Ls) can extend at least a length of a door ($L_{d1}$ or $L_{d2}$) on one side of the vehicle 20. In some embodiments, the stepping platform 1020 length (Ls) can extend at least half of a length of two doors (Ld) on one side of the vehicle 20. In some embodiments, the stepping platform 1020 length (Ls) can extend at least ¾ of a length of two doors (Ld) on one side of the vehicle 20. In some embodiments, the stepping platform 1020 length (Ls) can extend at least a length of two doors (Ld) on one side of the vehicle 20. In some embodiments, the stepping platform 1020 length (Ls) can extend about 2, 3, 4, 5, 6, 7, or 8 feet. In some embodiments, the stepping platform 1020 length (Ls) can extend at least about 2, 3, 4, 5, 6, 7, or 8 feet.

The stepping platform 1020 can connect to a support component 1030. In some embodiments, the stepping platform 1020 is attached to the support component 1030 so that the stepping platform 1020 and support component 1030 translate and/or rotate as one unit. In some embodiments, the stepping platform 1020 can rotate separately from the support component 1030. In some embodiments, support component 1030 and stepping platform 1020 can be a single piece. In some embodiments, the stepping platform 1020 can be integrally formed with the support component 1030. In some embodiments, the two pieces can be attached to one another through, for example, screws, though the particular attachment means does not limit the disclosure. In some embodiments, the support component 1030 can be substantially thinner than the stepping platform 102, as shown in, for example, FIG. 2.

A pair of arms 1040/1060 can rotatably attach to the support component 1030, allowing for rotation of the support component 1030, and thus the stepping platform 1020. The arms 1040/1060 can be attached to the support component 1030 through the rotation axes 1140. In some embodiments, either one or both of arms 1040/1060 can have a stop, which can be used to prevent the vehicle step 1000 from moving outside a desired rotation. The stops can be, for example, rubber to prevent motion of the vehicle step 1000 while preventing scratching or other damage. However, the particular makeup of the stops does not limit the disclosure. In some embodiments, the combination of stepping platform 1020, support component 1030, and arms 1040/1060 can be known as the stepping fixture. While only two arms are shown, more arms could be used as well. Further, each arm 1040/1060 could be broken into different segments that may or may not rotate with respect to each other. In some embodiments, another bar can connect arms 1040/1060.

On the opposite end from the support component 1030, arms 1040/1060 can attach to a frame 1080. The frame 1080 can be attached to the mounting bracket 150 attached the side bar 100, as discussed above. For example, the frame 1080 may be located approximately at the body 153 of the mounting bracket 150. Screws 1055 can be used to affix the frame 1080 to the mounting bracket 150, though the type of fixture does not limit the disclosure and any type of fixture can be used. In some embodiments, a top surface of the frame 1080 can additionally be attached to the bottom of a vehicle frame.

By attaching the frame 1080 to the mounting bracket 150, the frame 1080 can be located below the frame of a vehicle. In some embodiments, the entirety of the frame 1080 is below the frame of the vehicle. In some embodiments, at least about 50, 60, 70, 80, 90, 95, or 99% of the frame 1080 can be located below the frame of the vehicle. By having the frame 1080 located below the frame of the vehicle, it allows for the stepping platform 1020 to have a deployed position that is significantly lower than if the frame 1080 was attached to the frame of the vehicle, while not having to make any extensions to the arms 1040/1060. This allows the vehicle step 1000 to be advantageous for raised vehicles, as the stepping platform 1020 can now be located at a comfortable position relative to the ground for a user to step onto.

In some embodiments, the frame 1080 may contain a fastener that is sized and configured to be inserted into the longitudinal opening 106 of the side bar 100, and can operate in a similar fashion as discussed above with relation to the attachment of the side bar main body 102 to the mounting bracket 150. Accordingly, the side bar 100 can be translatable with respect to the frame 1080, and thus the step 1000.

In some embodiments, such as shown in FIG. 7, the frame 1080 may extend towards the centerline (e.g., inboard) of the vehicle. Accordingly, the frame 1080 may extend from an inside surface of the frame of the vehicle 20 towards the opposite inside surface of the frame of the vehicle 20. The arms 1040/1060 can be attached to frame 1080 through the rotation axes 1140. In some embodiments, the instant center of the vehicle step 1000 can be located within the vehicle step 1000 when the vehicle step 1000 is in the deployed or stowed position, or in both positions. In some embodiments, the instant center of the vehicle step 1000 is not located outside of the vehicle step 1000. For example, at any given moment, when the vehicle step 1000 is pivoting from one position to another, the stepping platform 1020 can be considered to be pivoting about one point in space (e.g., an "instant center") within the vehicle step 1000, as viewed perpendicular to the rotational axes 1140, such as viewed from the perspective of FIG. 7. In some embodiments, this one point could correspond to being within the horizontal dimension of the stepping platform 1020 (corresponding to an x axis in an x-y coordinate system), could correspond to being within vertical dimension of the stepping platform 1020 (corresponding to a y axis in an x-y coordinate system), or could corresponded to being within cross-section of the stepping platform 1020 in both the horizontal and vertical dimension.

Figure 9:
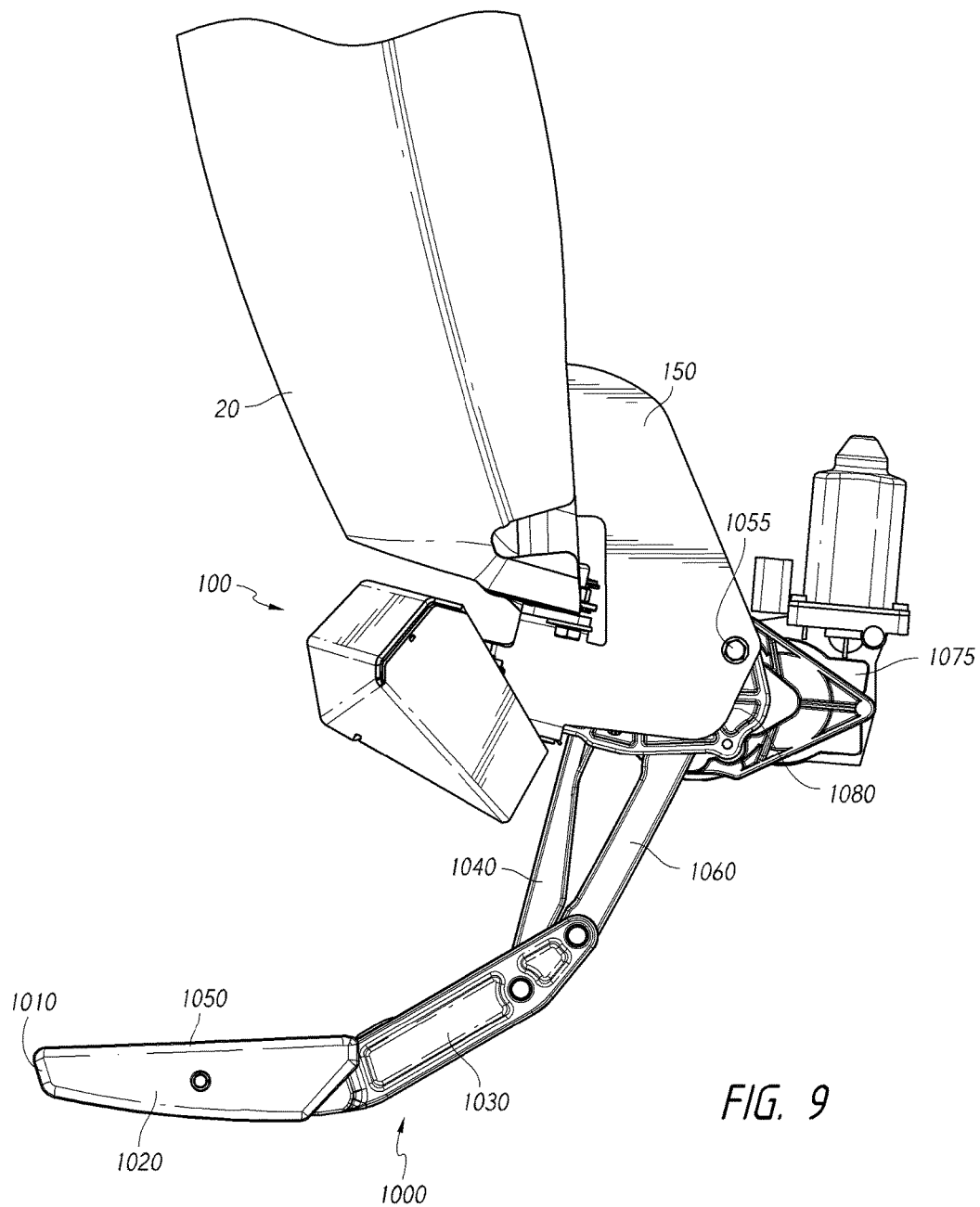
FIG. 9 illustrates an embodiment of a combination of a side bar and stepping structure in the stowed deployed.

In some embodiments, when the vehicle step 1000 is in the deployed position as shown in FIG. 9, the angle between the stepping platform 1020 and arm 1040 can be obtuse. In some embodiments, the angle between the stepping platform 1020 and arm 1040 can be about 90, 100, 110, 120, 130, 140, 150, 160, or 170°. In some embodiments, the angle between the stepping platform 1020 and arm 1040 can be greater than about 90, 100, 110, 120, 130, 140, 150, 160, or 170°. In some embodiments, the angle between the stepping platform 1020 and arm 1040 can be less than about 100, 110, 120, 130, 140, 150, 160, 170, or 180°.

In some embodiments, when the vehicle step 1000 is in the deployed position as shown in FIG. 9, the angle between the stepping platform 1020 and arm 1060 can be obtuse. In some embodiments, the angle between the stepping platform 1020 and arm 1060 can be about 90, 100, 110, 120, 130, 140, 150, 160, or 170°. In some embodiments, the angle between the stepping platform 1020 and arm 1060 can be greater than about 90, 100, 110, 120, 130, 140, 150, 160, or 170°. In some embodiments, the angle between the stepping platform 1020 and arm 1060 can be less than about 100, 110, 120, 130, 140, 150, 160, 170, or 180°.

Figure 10:
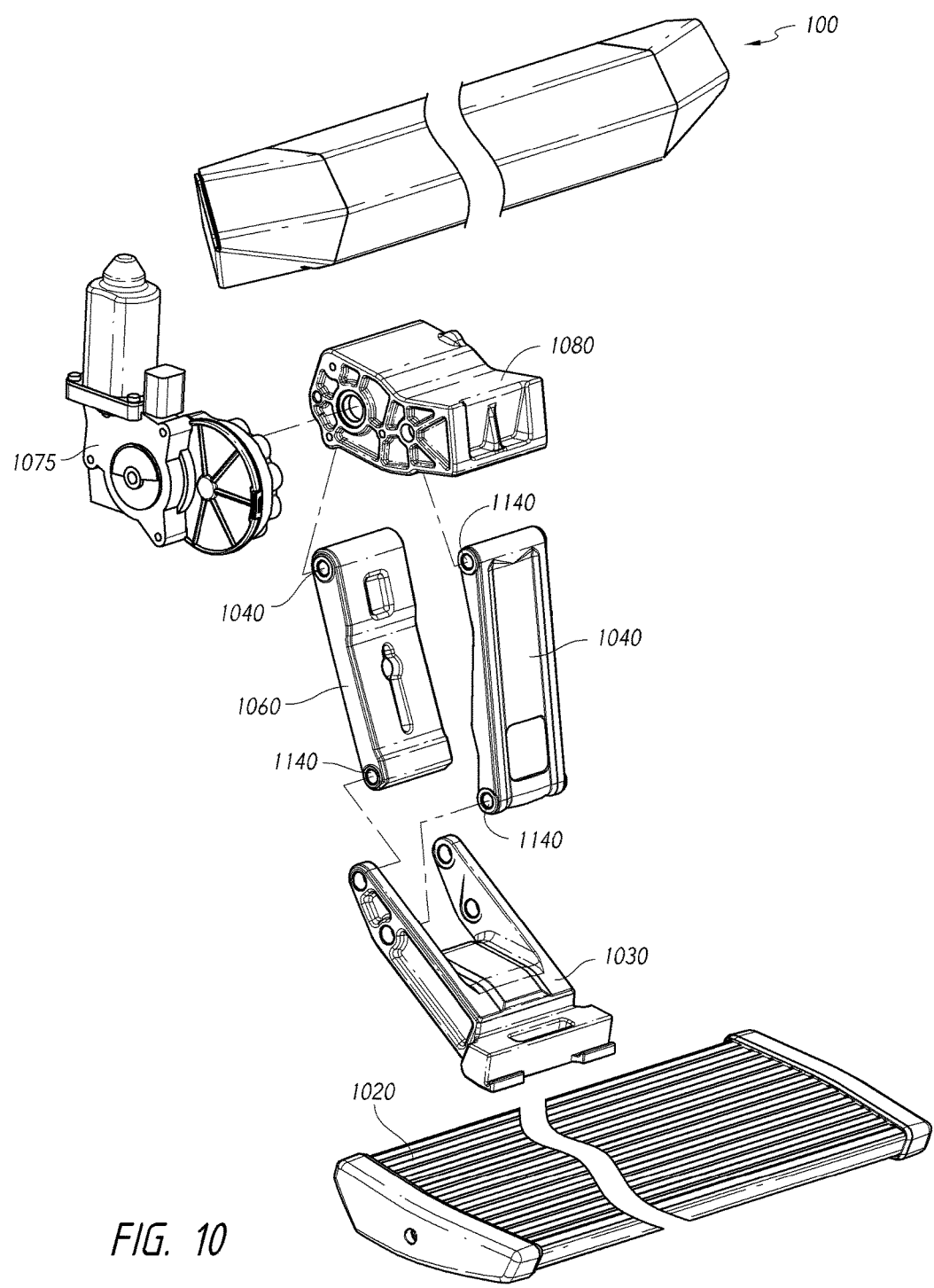
FIG. 10 illustrates an exploded view of an embodiment of a combination of a side bar and stepping structure.

FIG. 10 illustrates an exploded viewpoint of an embodiment of a vehicle step 1000, illustrates an example of how components of the vehicle step 1000 can fit together.

Figure 11:
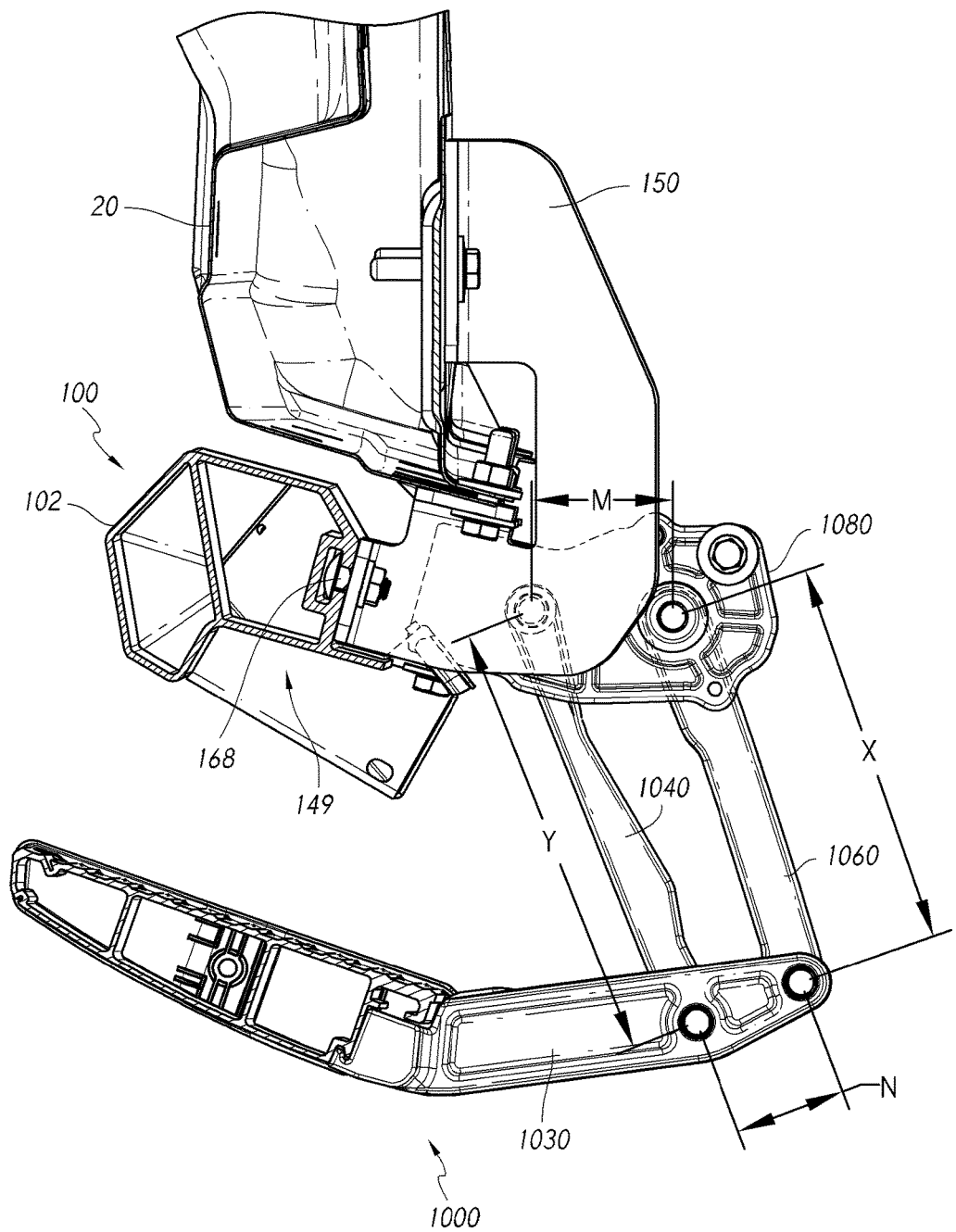
FIG. 11 illustrates an embodiment of a combination of a side bar and stepping structure in the intermediate position.

FIG. 11 illustrates an embodiments of a vehicle step 1000 in an intermediate position, in particular to more easily show dimensions for some of the different parts of the vehicle step 1000.

In some embodiments, the length (Y) of arm 1040 is the same as the length (X) of arm 1060. In some embodiments, the length (Y) of arm 1040 is different than the length (X) of arm 1060. In some embodiments, the length (Y) of arm 1040 is less than the length (X) of arm 1060. In some embodiments, the length (Y) of arm 1040 is greater than the length (X) of arm 1060.

In some embodiments, the distance (M) between the frame 1080 rotation points 1140 of arms 1040/1060 are the same as the distance (N) between the support component 1030 rotation points 1140 of arms 1040/1060. In some embodiments, the distance (M) between the frame 1080 rotation points 1140 of arms 1040/1060 is different than the distance (N) between the support component 1030 rotation points 1140 of arms 1040/1060. In some embodiments, the distance (M) between the frame 1080 rotation points 1140 of arms 1040/1060 is greater than the distance (N) between the support component 1030 rotation points 1140 of arms 1040/1060. In some embodiments, the distance (M) between the frame 1080 rotation points 1140 of arms 1040/1060 is less than the distance (N) between the support component 1030 rotation points 1140 of arms 1040/1060.

In some embodiments, arms 1040/106 are not parallel when in the stowed position. In some embodiments, arms 1040/1060 are not parallel when in the intermediate position. In some embodiments, arms 1040/1060 are not parallel when in the deployed position. In some embodiments, arms 1040/1060 are not parallel through the entire range of motion of the vehicle step 1000.

In some embodiments, arms 1040/106 are parallel when in the stowed position. In some embodiments, arms 1040/1060 are parallel when in the intermediate position. In some embodiments, arms 1040/1060 are parallel when in the deployed position. In some embodiments, arms 1040/1060 are parallel through the entire range of motion of the vehicle step 1000.

Components of the disclosed vehicle step 1000 can comprise a structurally strong and/or light weight material. In some embodiments, the vehicle step 1000 can comprise a fiber reinforced composite material such as a carbon fiber reinforced plastic or thermoplastic with, for example, a polymer matrix or resin. In some embodiments, the vehicle step 1000 can comprise other suitable composites, plastics, thermoplastics, metals, alloys, ceramics, among others, with efficacy, as needed or desired. However, the particular material used does not limit the disclosure.

In some embodiments, a plurality of stepping structures can be used. FIGS. 3A-B illustrate an embodiment which can use a plurality of steps on a single side of a vehicle in order to, for example, retain movable running boards. As shown, a first vehicle step 1000 and a second vehicle step 1000' can be used to hold a horizontal running board 8020 similar to what is described in detail above. More can be used as well, and the number of attachment mechanisms does not limit the disclosure. In some embodiments, the vehicle steps 1000/1000' can move in concert, allowing the horizontal running board 8020 to move from the stowed position (FIG. 3B), through the intermediate position and into the deployed position (FIG. 3A).

Self-Energizing Mechanism for Vehicle Step

In some embodiments, the vehicle step 1000 can be self-energizing in either the deployed or stowed position, or in both positions. For example, a planar four-bar linkage can be used in some embodiments of the vehicle step 1000, allowing for stability and predictability in motion of the step. In some embodiments, a planar quadrilateral linkage can be used for self-energizing the vehicle step 1000. In some embodiments, a planar quadrilateral crank-rocker linkage can be used, which is described below.

In the stowed and deployed positions (respectively shown in FIGS. 7 and 9), the vehicle step 1000 is in a self-energized position so that a load applied to the top of the stepping platform 1020 in a relatively downwards motion does not move the vehicle step 1000 towards an intermediate position.

For example, any force exerted downward onto the bar the stepping platform 1020 of vehicle step 1000 desirably will increase the resistance of the vehicle step 1000 to moving. In some embodiments, the stepping platform 1020 would need to move upward before the vehicle step 1000 can translate.

In some embodiments, a motor 1075 can be used in conjunction with the vehicle step 1000. In some embodiments the motor 1075 can be rigidly mounted to the underside of a vehicle, such as through the use of a mounting bracket, thought the particular mounting method does not limit the disclosure. In some embodiments, the motor 1075 can be located generally adjacent to the vehicle step 1000.

In some embodiments, the motor 1075 turns a pinion gear about an axis roughly parallel to the plane defined by the underbody of a vehicle. The pinion gear can mesh with drive teeth formed at the end of arm 1060. Actuation of the motor 1075 can cause the pinion gear to rotate and the arm 1060 to counter-rotate with respect to the motor 1075 and pinion gear. As the arm 1060, rotates it can push the stepping platform 1020 by virtue of its connection to support component 1030. Thus, when the motor 1075 rotates, the motor 1075 can move the stepping platform 1020 between a stowed position (FIG. 7) wherein the stepping deck is generally positioned inward from the exterior of the vehicle or fixed running board and a deployed position (FIG. 9) in which the stepping platform 1020 is extended sufficiently to provide a step for at least the forefoot portion of a user's foot.

As the vehicle step 1000 moves between the stowed position and the deployed position under the power of the motor 1075, arm 1040 rotates as well and the deployed position is reached when the stop contact arm 1060.

When the vehicle step 1000 is in the deployed position, a downward force exerted on the stepping platform 1020 causes a stop to bear against arm 1060. This arrangement causes the load on the stepping platform 1020 to be borne primarily by the support component 1030 and arm 1040. In the deployed position, the vehicle step 1000 takes on a geometry such that the support component 1030 and arm 1040 are loaded in tension. The torque generated by a load on the stepping platform 1020 is opposed by arm 1060, which is thus loaded in axial compression. Due to the particular configuration, the motor 1075 is isolated from the load on the stepping platform 1020.

This aspect of the vehicle step 1000 prevents damage to the motor 1075 by eliminating "back-loading," as there is no torque reaction about the end of arm 1060, even when very heavy loads are placed on the stepping platform 1020. Thus the motor 1075 is not needed to exert a counter-torque on arm 1060 to support the load on the stepping platform 1020.

This feature also eliminates the need for balky, unreliable clutches or any other means of disconnecting the motor 1075 from the vehicle step 1000, or retractable stops or the like to engage and support the vehicle step 1000 when in the extended position.

With these features the vehicle step 1000 provides a practical stepping assist for a vehicle user, which can be quickly moved into an extended position for use and retracted out of the way when necessary. As detailed above, this functionality is provided with a minimum of mechanical complexity and a high level of reliability. Moreover, the vehicle step 1000 is easily connected to a vehicle's existing systems to allow even greater usability. For example, the motor 1075 may be connected to the vehicle's electrical system to cause the vehicle step 1000 to quickly move to the extended position upon shutting off the vehicle's engine, placing the vehicle in park, opening a door, or signaling the power door-lock system with a remote device or control such as a key fob control. Similarly, the motor 1075 may be signaled to retract the vehicle step 1000 upon starting the engine, placing the vehicle in drive, closing or locking the door(s) with which the step is associated, etc.

In the embodiment presently under discussion, when the vehicle step 1000 is in the stowed position, it is concealed, preferably completely concealed, from the view of a typical standing adult curbside observer of the vehicle. In this position the vehicle step 1000, can be disposed behind the lowest extension or lower edge of the vehicle underbody. In some embodiments, the vehicle step 1000 is not visible to an adult standing 5 feet from the vehicle; in some embodiments, the vehicle step 1000 is not visible to an adult standing 10 feet from the vehicle; in some embodiments, the vehicle step 1000 is not visible to an adult standing 20 feet from the vehicle.

In some embodiments, a clutch may be used as well.

In some embodiments, in the self-energized position there can be some slight rotational movement of the stepping platform 1020. For example, the stepping platform 1020 can rotate approximately 0.5, 1, 2, 3, 4, or 5 degrees without movement of the vehicle step 1000 or/or moving the vehicle step 1000 to a position where the vehicle step 1000 is not still self-energized. In some embodiments, the stepping platform 1020 can rotate approximately less than 0.5, 1, 2, 3, 4, or 5 degrees without translating the vehicle step 1000 or/or moving the vehicle step 1000 to a position where the vehicle step 1000 is not still self-energized. This ensures that the vehicle step 1000 remains self-energized even if the stepping platform 1020 is bumped and/or moves somewhat.

Integration of Stepping Structure and Side Bar

In some embodiments, the side bar 100 and step 1000 can be attached to one another through the use of a mounting bracket 150. In some embodiments, the side bar 100 and step 1000 can be removably attached to one another. In some embodiments, the side bar 100 and step 1000 can be permanently attached to one another. Further, as discussed above, the side bar 100 may be configured to translate in comparison to the step 1000.

Figure 12:
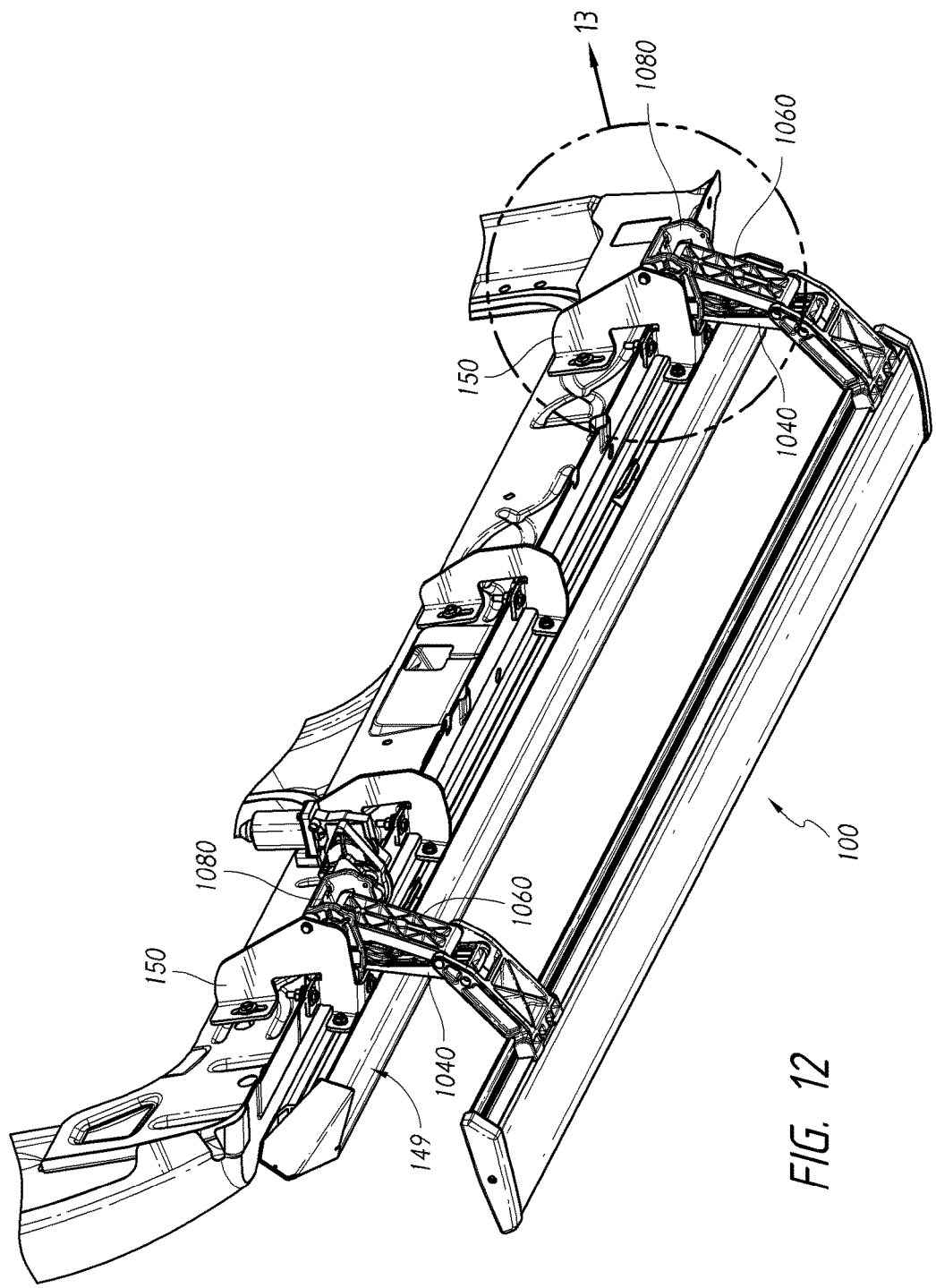
FIG. 12 illustrates a reverse view of an embodiment of a combination of a side bar and stepping structure attached to a vehicle.

FIG. 12 shows a reverse viewpoint with the step 1000 in the deployed position. As shown, the frame 1080 of the step 1000 can be attached to a mounting bracket 150. The mounting bracket 150 can then be attached to the vehicle. Further, the side bar 100 can also be attached to the mounting bracket 150, thereby forming the combination assembly 10. As shown in FIG. 12, a plurality of mounting brackets 150 can be used in the combination assembly 10. In some embodiments, the mounting brackets 150 may attach to both the step 1000 and side bar 100. In some embodiments, the mounting brackets 150 may only attached to the side bar 100. FIG. 13 shows a close-up view of the connection portions of the side bar 100, mounting bracket 150, and step 1000.

Figure 14:
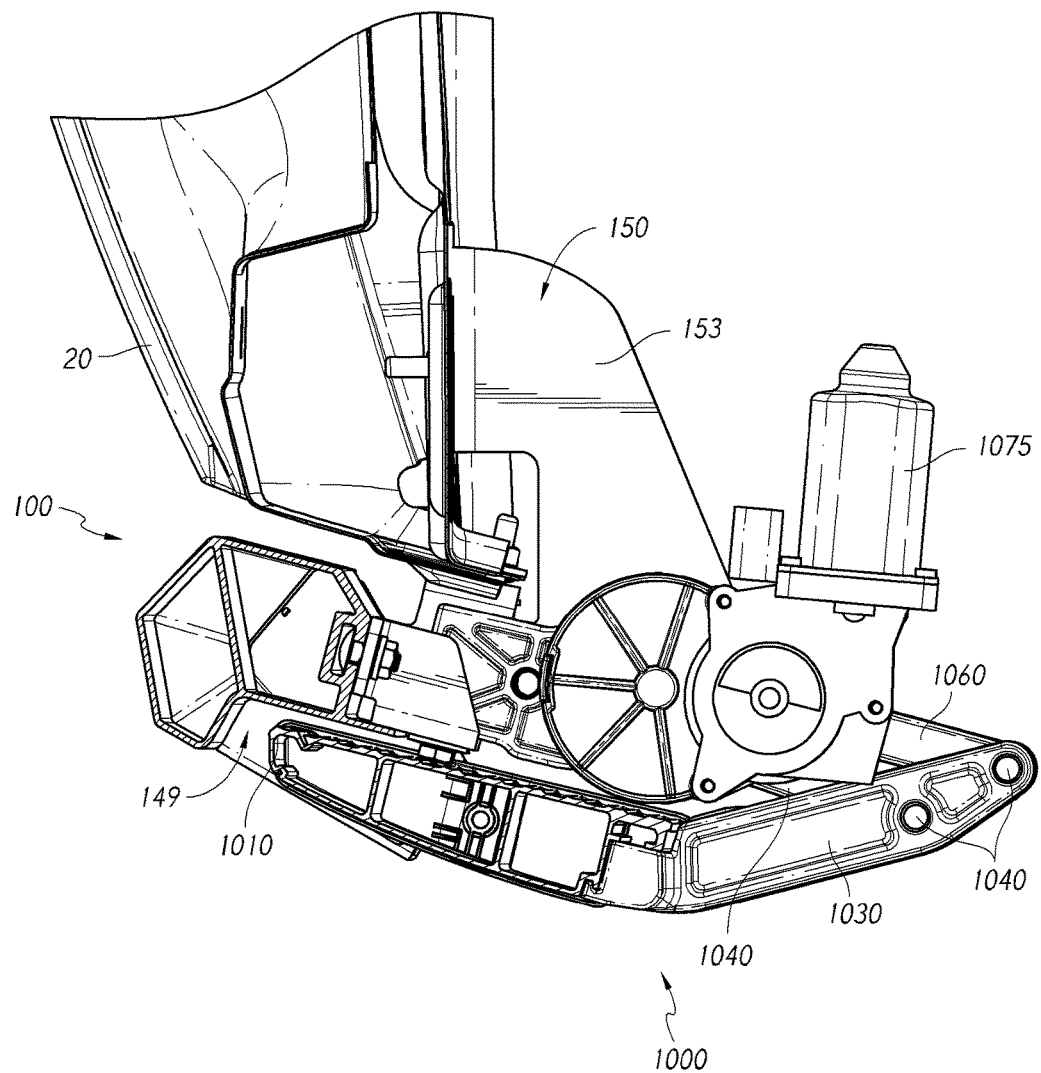
FIG. 14 illustrates a cross-sectional view of an embodiment of the side bar and stepping structure in the stowed configuration.

FIG. 14 shows a cross section of the side bar 100 and step 1000 in the stowed position. Specifically, as shown, at least a front edge 1010 of the stepping platform 1020 can be located within the channel 149 of the side bar main body 102. By having the stepping platform 1020 be located within the channel 149, the combination assembly 10 can have improved aesthetic appeal, as well as allowed the step 1000 to be located out of the way. Without such a channel 149, the step 1000 would have to be located below or behind the side bar 100. If it was below the side bar 100, the step would be located in an unappealing position, and may be more easily damaged than if located within the channel 149. If the step 100 was located behind the side bar 100, it would have a significant distance to extend for viable use by a user, which could provide unwanted torque onto the motor 1075.

In some embodiments, the step 1000 and side bar 100 can be used on both sides of vehicle 20. In some embodiments, the step 1000 and side bar 100 are the same length (Ls/Lr) on both sides of vehicle 20. In some embodiments, the step 1000 and side bar 100 are the different lengths (Ls/Lr) on both sides of vehicle 20. In some embodiments, the step 1000 and side bar 100 can have a different length (Ls/Lr). In some embodiments, the step 1000 and side bar 100 can have the same length (Ls/Lr).

From the foregoing description, it will be appreciated that embodiments of an inventive vehicle step and side bar combination are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such steps need not be performed in the particular order shown or in sequential order, and that all steps need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A vehicle assembly having both a side bar and a movable vehicle step, the assembly comprising:
   the movable vehicle step having a stepping platform, the movable vehicle step configured to be mounted to a frame of a vehicle and configured to move between a stored position and a deployed position; and
   the side bar configured to be mounted to the frame of the vehicle, the side bar mounted to extend outboard from the frame;
   wherein, in the stored position, the stepping platform is at least partially enclosed on at least two sides by the side bar; and
   wherein, in the deployed position, the stepping platform is located outboard and downwards with respect to the side bar.

2. The vehicle assembly of claim 1, wherein the movable vehicle step is configured to move upwards and inboard when moving from the deployed position to the stored position.

3. The vehicle assembly of claim 1, wherein the movable vehicle step is self-energizing.

4. The vehicle assembly of claim 1, wherein the movable vehicle step and the side bar are both configured to attach to a bracket configured to attach to the frame of the vehicle.

5. The vehicle assembly of claim 1, wherein in the stored position, the stepping platform is located at least partially between end caps on opposing ends of the side bar.

6. The vehicle assembly of claim 1, wherein the side bar extends below the frame of the vehicle.

7. The vehicle assembly of claim 1, further comprising a gap between the side bar and the frame of the vehicle.

8. The vehicle assembly of claim 1, further comprising a motor configured to move the movable vehicle step between the deployed position and the stored position.

9. The vehicle assembly of claim 1, wherein the stepping platform is at least partially enclosed on at least four sides by the side bar in the stored position.

10. A vehicle for assisting users entering a door of the vehicle, the vehicle comprising:
 a vehicle frame;
 a movable vehicle step having a stepping platform, the movable vehicle step mounted to the frame and configured to move between a stored position and a deployed position; and
 a side bar mounted to the frame and positioned to provide a stepping surface;
 wherein, in the stored position, the stepping platform is at least partially enclosed on at least two sides by the side bar; and
 wherein, in the deployed position, the stepping platform is located outboard and downwards with respect to the side bar.

11. The vehicle of claim 10, wherein the movable vehicle step is configured to move upwards and inboard when moving from the deployed position to the stored position.

12. The vehicle of claim 10, wherein the movable vehicle step is self-energizing.

13. The vehicle of claim 10, wherein the movable vehicle step and the side bar are both attached to a bracket attached to the frame of the vehicle.

14. The vehicle of claim 10, wherein in the stored position, the stepping platform is located at least partially between end caps on opposing ends of the side bar.

15. The vehicle of claim 10, wherein the side bar extends below the frame.

16. The vehicle of claim 10, further comprising a gap between the side bar and the frame.

17. The vehicle of claim 10, further comprising a motor configured to move the movable vehicle step between the deployed position and the stored position.

18. The vehicle of claim 10, wherein the stepping platform is at least partially enclosed on at least four sides by the side bar in the stored position.

19. A vehicle assembly having both a side bar and a movable vehicle step, the assembly comprising:
 the movable vehicle step having a stepping platform, the movable vehicle step configured to be mounted to a frame of a vehicle and configured to move between a stored position and a deployed position; and
 the side bar configured to be mounted to the frame of the vehicle to be visually exposed to a user viewing the vehicle from outboard the vehicle;
 wherein, in the stored position, the stepping platform is at least partially enclosed on at least two sides by the side bar; and
 wherein, in the deployed position, the stepping platform is located outboard and downwards with respect to the side bar.

* * * * *